(12) United States Patent
Hyp et al.

(10) Patent No.: US 6,592,310 B2
(45) Date of Patent: Jul. 15, 2003

(54) TIE-DOWN HOOP

(75) Inventors: Eric D. Hyp, Aspers, PA (US); Abigail Kelly, Brooklyn, NY (US); William E. Sokurenko, Glen Mills, PA (US); Kevin Drayer, Waterford, PA (US); Robin Talukdar, Newark, DE (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 09/880,527

(22) Filed: Jun. 12, 2001

(65) Prior Publication Data

US 2002/0084338 A1 Jul. 4, 2002

Related U.S. Application Data

(60) Provisional application No. 60/221,349, filed on Jul. 26, 2000, and provisional application No. 60/210,740, filed on Jun. 12, 2000.

(51) Int. Cl.[7] .............................. B61D 45/00; B60N 2/08
(52) U.S. Cl. ..................................... 410/104; 296/65.13
(58) Field of Search ................................. 410/101, 104, 410/105; 296/65.03, 65.13

(56) References Cited

U.S. PATENT DOCUMENTS

| 235,299 | A | | 12/1880 | Routh |
|---|---|---|---|---|
| 980,193 | A | | 1/1911 | Brenia |
| 1,407,884 | A | | 2/1922 | Ohnstrand |
| 1,705,071 | A | | 3/1929 | Sheehan |
| 2,052,914 | A | * | 9/1936 | Williams ................ 410/9 |
| 2,701,114 | A | | 2/1955 | Donaldson |
| 2,736,272 | A | * | 2/1956 | Elsner .................. 410/105 |
| 3,082,473 | A | | 3/1963 | West |
| 3,153,806 | A | | 10/1964 | Jakeway |
| 3,158,284 | A | | 11/1964 | Henchert |
| 3,963,104 | A | | 6/1976 | Lautin |
| 4,005,904 | A | | 2/1977 | Weman |
| 4,297,962 | A | | 11/1981 | Johnson, Jr. |
| 4,490,884 | A | | 1/1985 | Vickers |
| 4,630,333 | A | | 12/1986 | Vickers |
| 4,699,410 | A | * | 10/1987 | Seidel .................. 294/1.1 |
| 4,742,602 | A | | 5/1988 | Horner |
| 4,787,667 | A | * | 11/1988 | Nishino ................ 296/65.13 |
| 4,850,769 | A | | 7/1989 | Matthews |
| 4,907,921 | A | | 3/1990 | Akright |
| 5,109,573 | A | | 5/1992 | Sherman |
| 5,180,263 | A | * | 1/1993 | Flowers, Jr. ............ 410/106 |
| 5,259,711 | A | | 11/1993 | Beck |
| 5,368,355 | A | * | 11/1994 | Hayden et al. ......... 296/65.13 |
| 5,409,335 | A | | 4/1995 | Beck |
| 5,461,755 | A | | 10/1995 | Hardigg et al. |
| 5,674,033 | A | | 10/1997 | Ruegg |
| 5,774,948 | A | | 7/1998 | Petschke et al. |
| 6,068,310 | A | | 5/2000 | Fuller et al. |
| 6,213,696 | B1 | | 4/2001 | Austin |
| 6,230,372 | B1 | | 5/2001 | Sokurenko et al. |
| D446,442 | S | | 8/2001 | Simpson |

* cited by examiner

*Primary Examiner*—D. Glenn Dayoan
*Assistant Examiner*—Paul Chenevert
(74) *Attorney, Agent, or Firm*—Paul & Paul

(57) ABSTRACT

The invention is a tie-down hoop for slidably mounting within a guide rail. An embodiment of the tie-down hoop includes a hoop, a button, a bezel, an elastomeric spring, and a sliding plate. Other embodiments of the tie-down hoop may include a hoop, a bezel, possibly a bushing between the hoop and bezel, a sliding plate, and at least one elastomeric spring. The bezel is biased towards the top of the guide rail by the spring. The top of the guide rail includes a plurality of detents for securing the tie-down hoop in a desired position. The tie-down hoop may be employed in vehicle seat guide rails to tie down cargo to the vehicle floor.

43 Claims, 23 Drawing Sheets

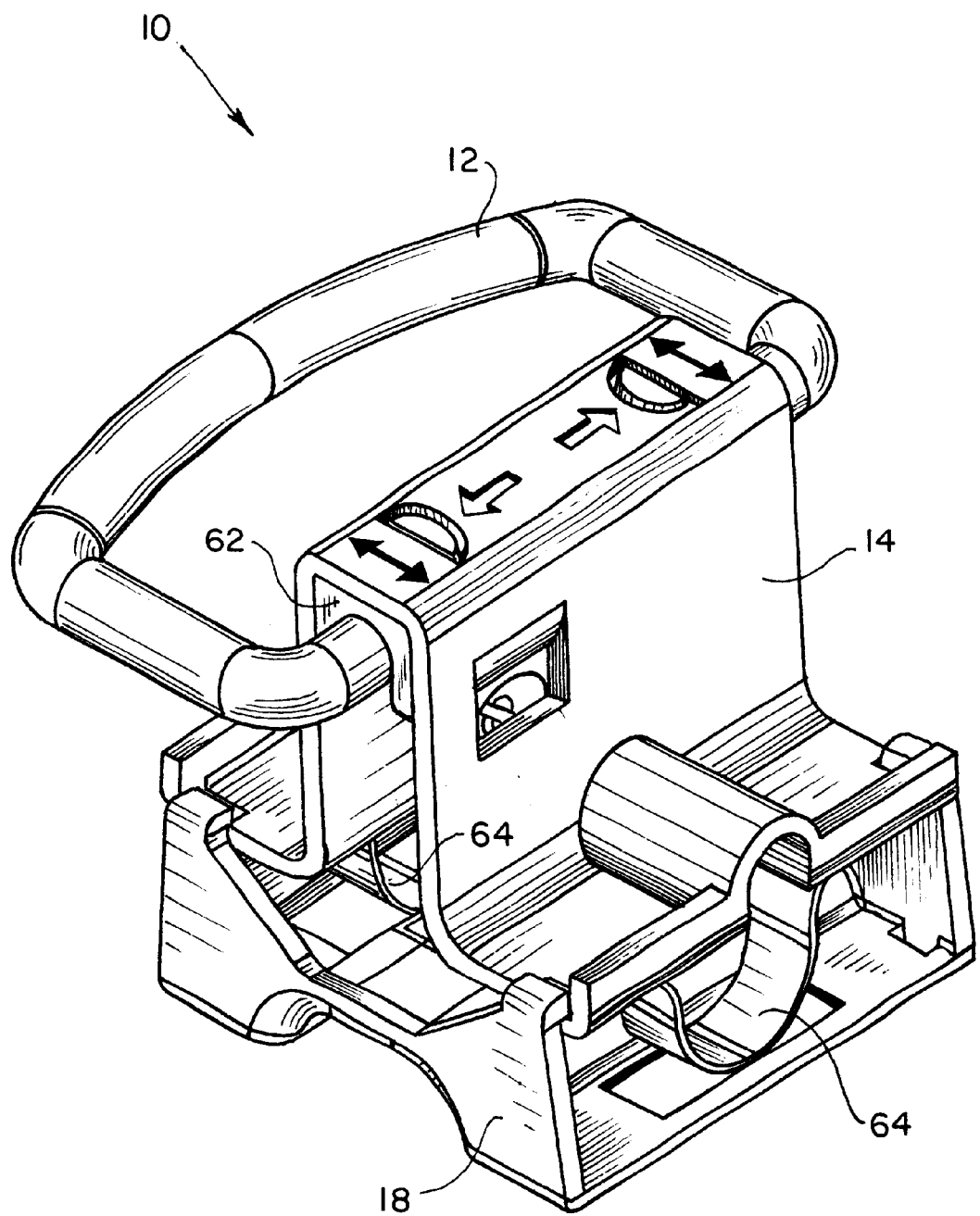
F I G. 4

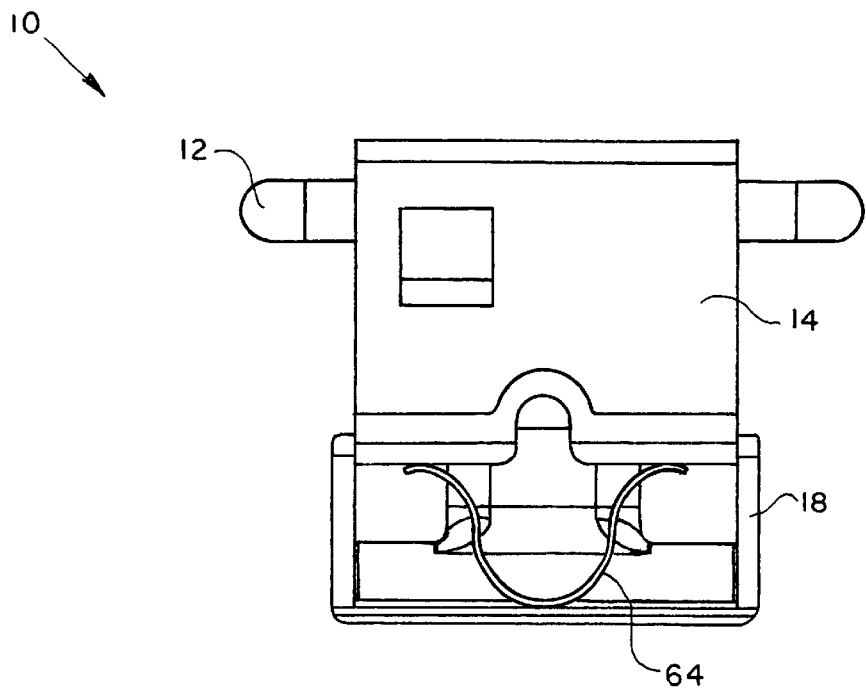
F I G. 5
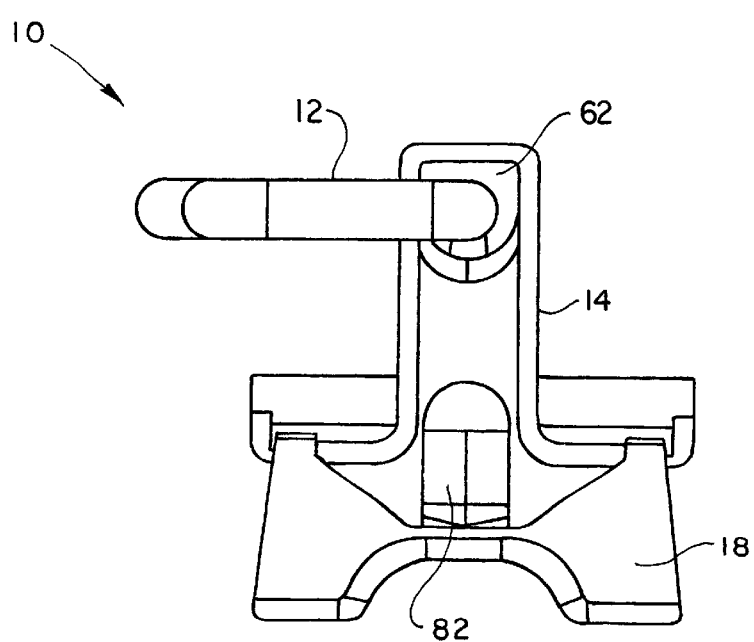
F I G. 6

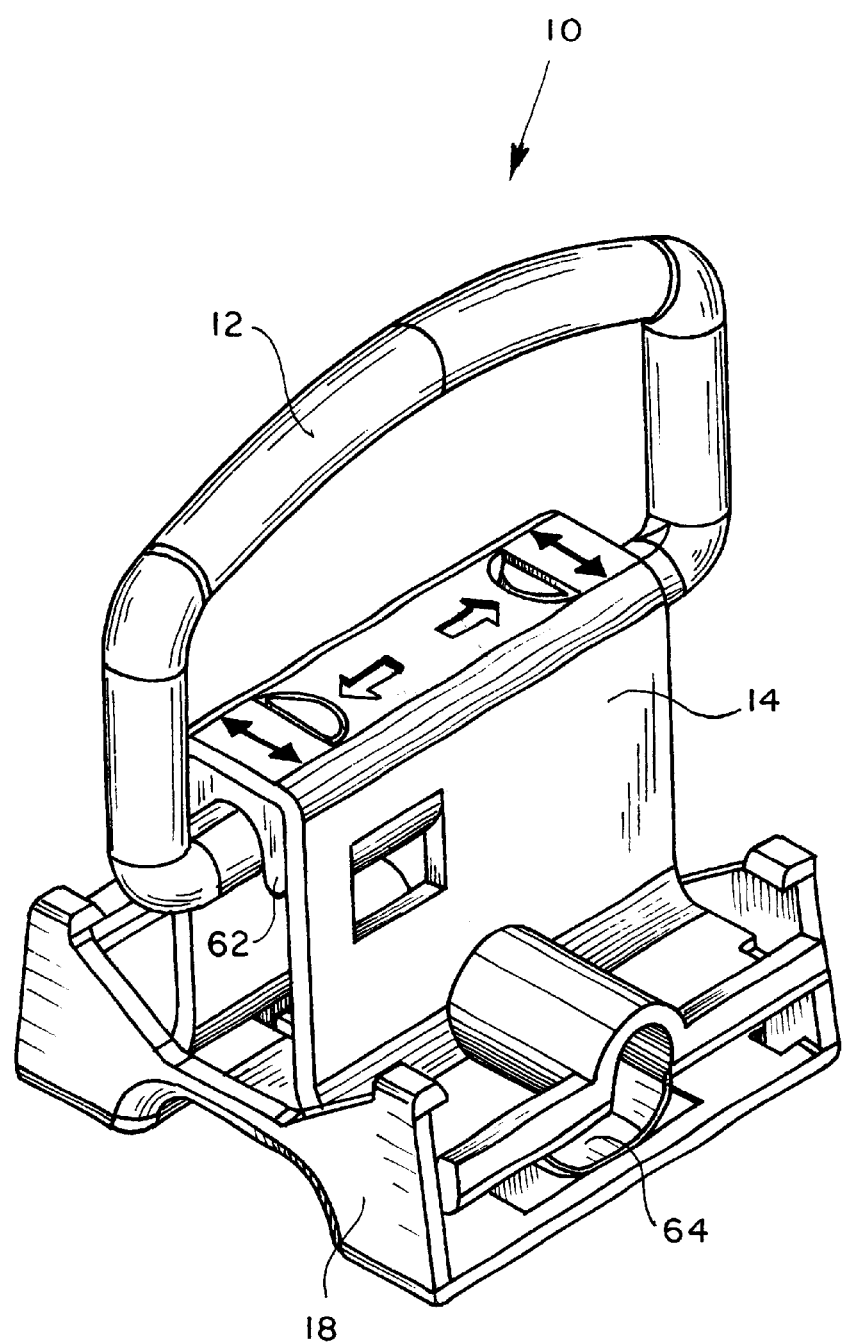
F I G. 7

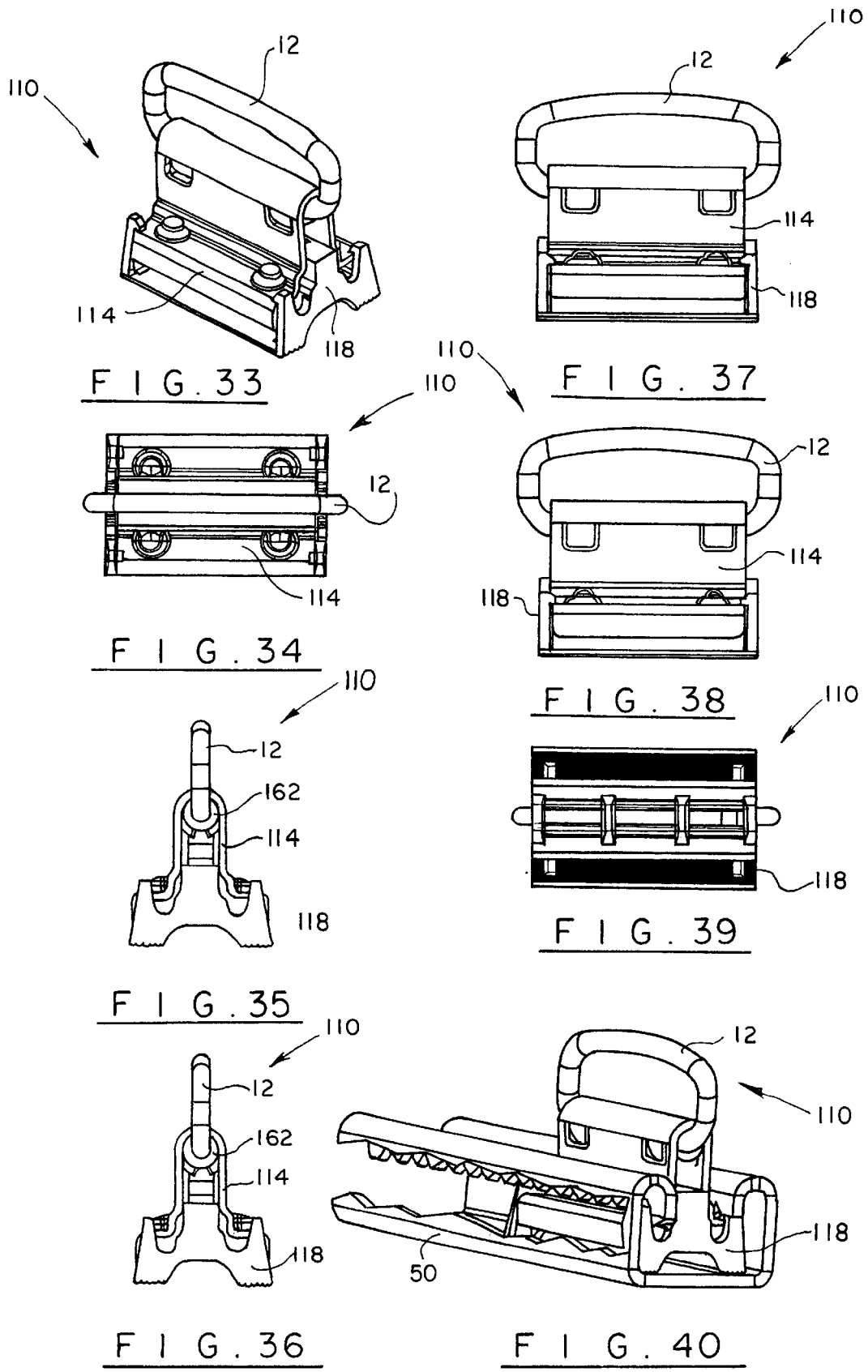

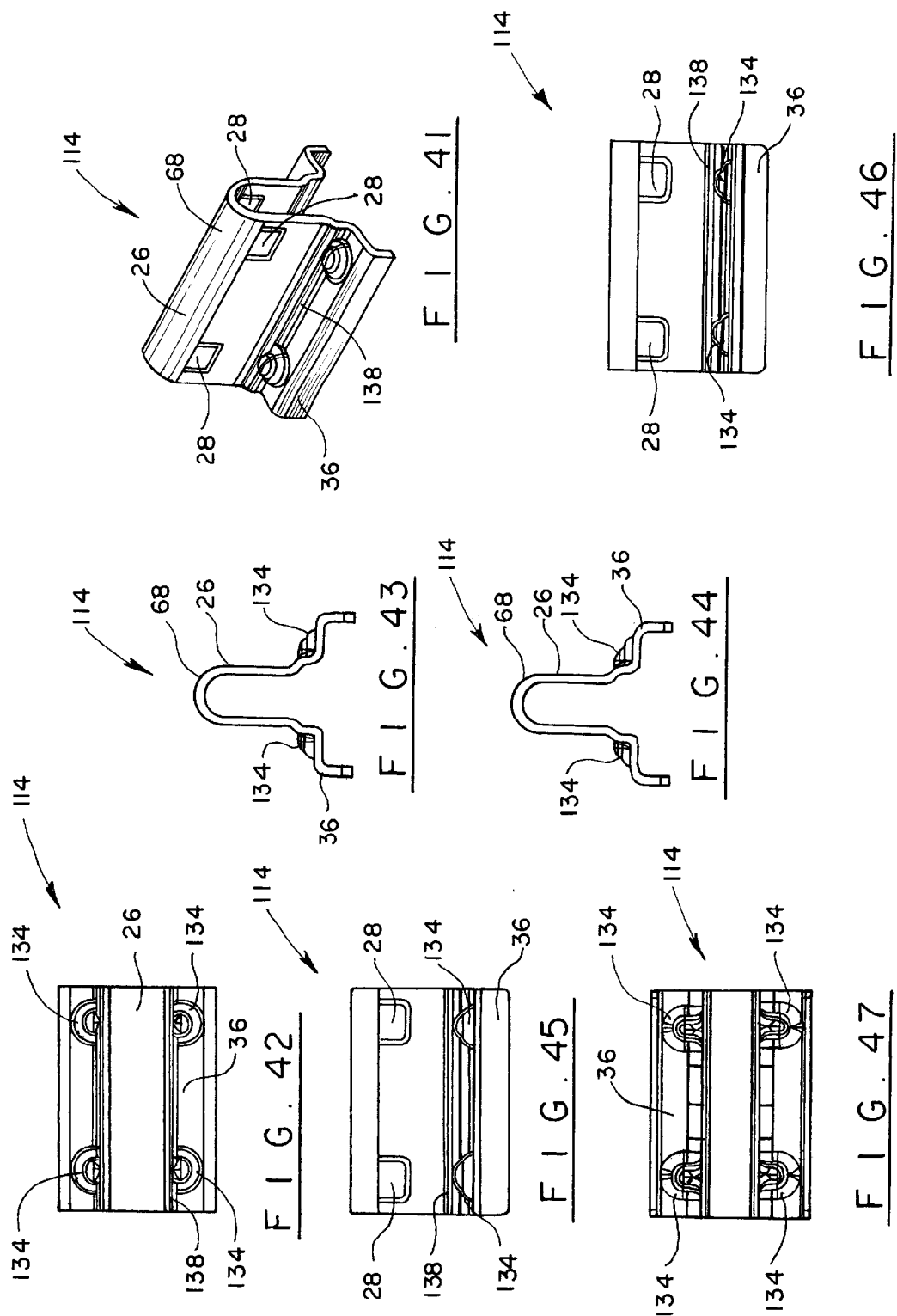

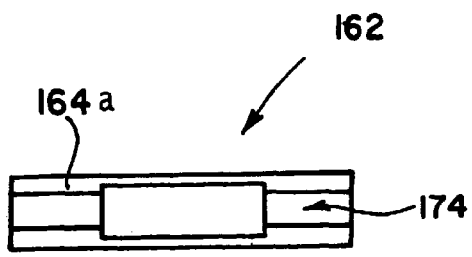
F I G. 49
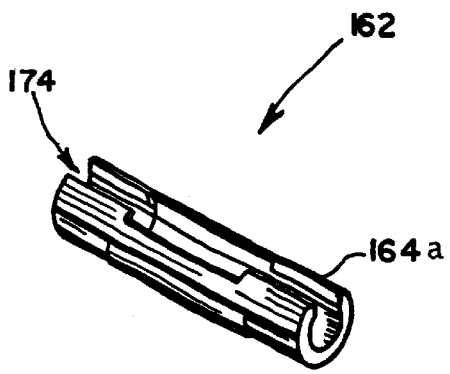
F I G. 48
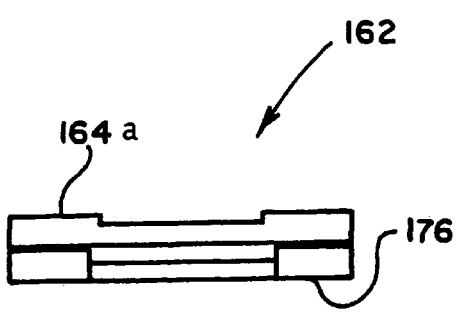
F I G. 52
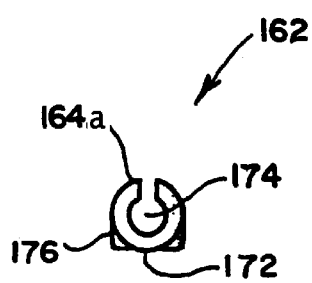
F I G. 50
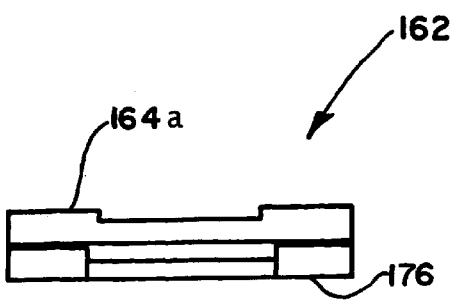
F I G. 53
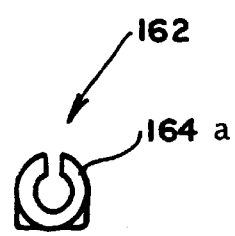
F I G. 51
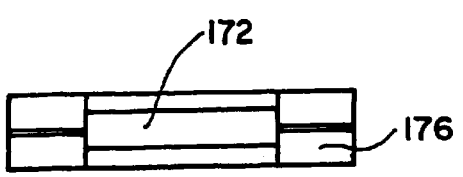
F I G. 54

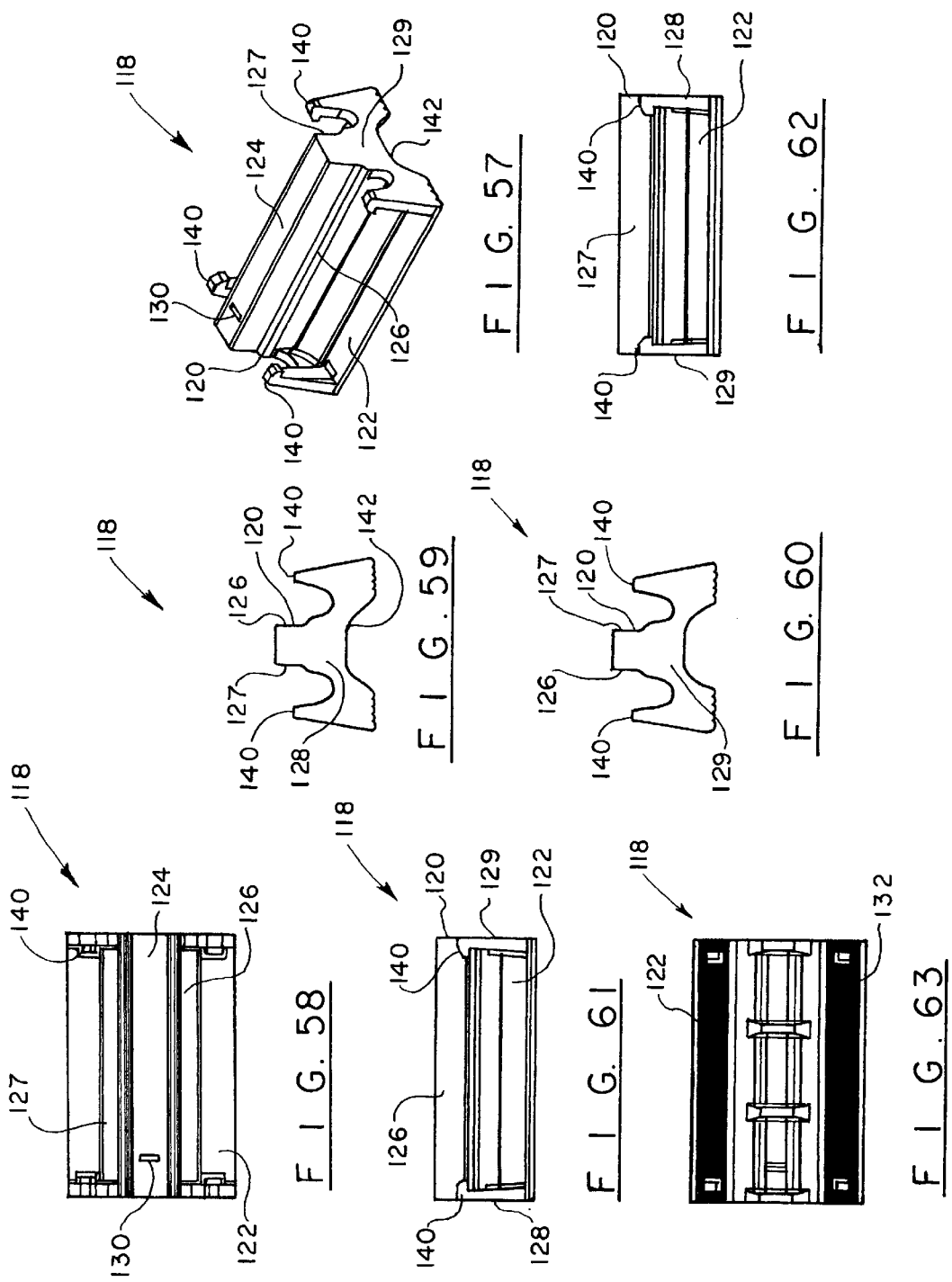

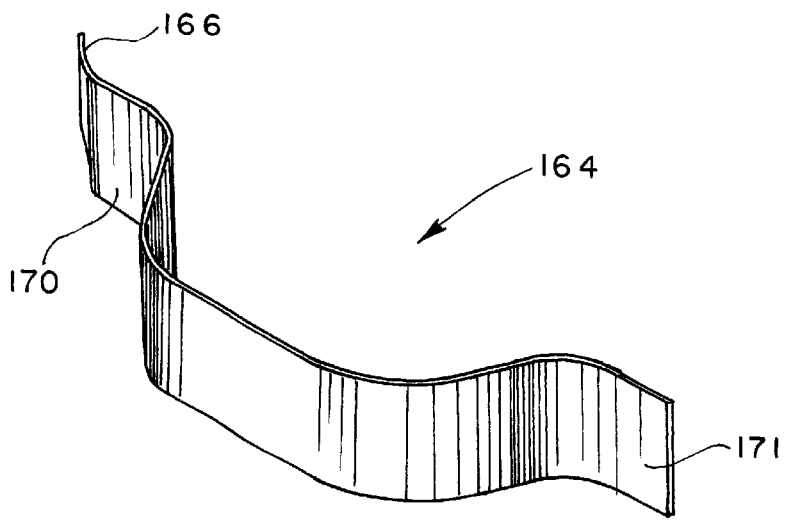
F I G. 64
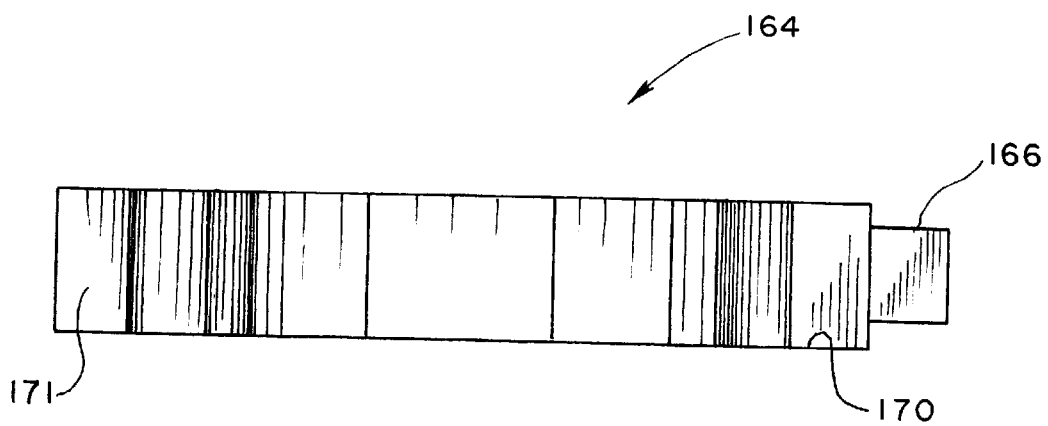
F I G. 65

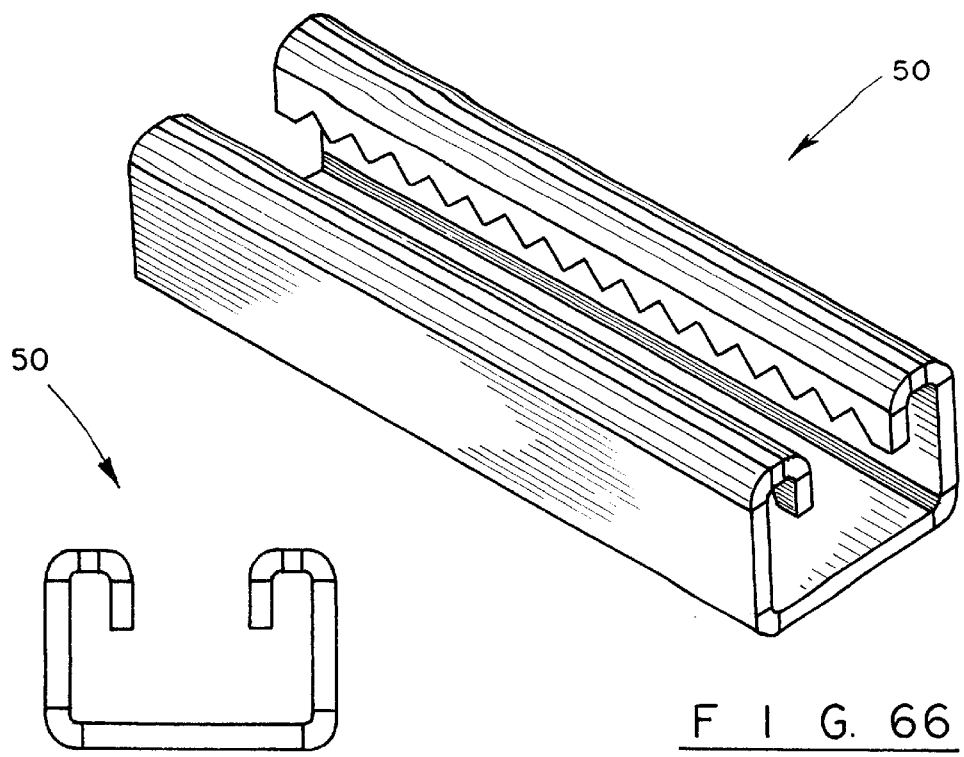
FIG. 66
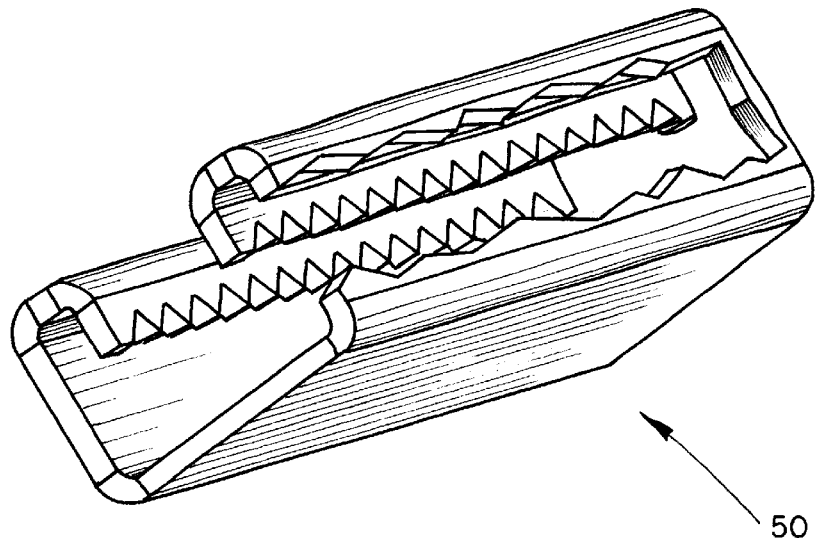
FIG. 68
FIG. 67

TIE-DOWN HOOP

CROSS-REFERENCE TO RELATED APPLICATIONS

This utility patent application is based on U.S. provisional patent application No. 60/210,740, filed Jun. 12, 2000 and U.S. provisional patent application No. 60/221,349, filed Jul. 26, 2000.

BACKGROUND OF THE INVENTION

1. Field of the Invention

The invention is a tie-down hoop slidably mounted within a guide rail. The hoop may be slid to a desired position along the rail, and secured in that position.

2. Description of the Related Art

Tie-down hoops and pulls are commonly used to prevent loads from shifting within a vehicle. Examples of presently available pulls include those illustrated in the *Southco Handbook* 2000, pp. 304–305. None of the illustrated tie-down hoops is slidably mounted for use at different locations within a vehicle storage area.

None of the above-referenced publications, taken singly or in combination, is seen to describe the present invention as claimed.

SUMMARY OF THE INVENTION

The invention is a tie-down hoop slidably mounted inside a guide rail or track. An embodiment of the tie-down hoop may comprise a hoop, a button, a bezel, a sliding plate, and an elastomeric spring between the bezel and sliding plate.

The hoop is preferably a D-shaped wire form hoop. The bottom portion of the hoop is secured within the central portion of the bezel, possibly with a tab. The bezel includes a lug on either side, dimensioned and configured to engage a detent in the guide rail. A button may be secured on top of the bezel's central portion. The hoop may be surrounded by a bushing within the bezel, for providing friction and detents for securing the hoop in desired orientations.

The sliding plate is secured to the bottom of the bezel, with an elastomeric spring, such as a foam block or leaf spring, in between. The bezel is thereby biased away from the elastomeric spring.

The guide rail includes a bottom, a pair of sides, and a top section adjacent to each side. Each top section extends horizontally across the top adjacent to the side of the rail, leaving an opening between the two top sections dimensioned and configured to permit the D-shaped wire hoop and the portion of the bezel containing the hoop to slide between them. A flange extends downward from each top section. The flange includes a plurality of detents dimensioned and configured to mate with the lugs on the bezel to secure the tie-down hoop in position.

In use, the bezel will be biased upward so that its lugs engage a pair of detents in the guide rail. The tie-down hoop is thereby prevented from sliding within the rail. Downward pressure on the button compresses the elastomeric spring, thereby moving the bezel's lugs out of the detents and permitting the tie-down hoop to slide within the rail. When pressure on the button is released, the bezel's lugs are biased against the guide rail's flanges. When the tie-down hoop reaches the next pair of detents, the elastomeric spring will push the bezel's lugs into the spring.

Some users may find it advantageous to position the tie-down hoops within the same guide rails that secure the seats within the vehicle.

It is therefore an object of the present invention to provide a tie-down hoop for use within a vehicle storage compartment.

It is a second object of the invention to provide a tie-down hoop slidably mounted within a guide rail.

It is a third object of the present invention to provide a tie-down hoop engaging a pair of detents within the guide rail to remain in a desired location.

It is a fourth object of the present invention to provide a tie-down hoop that uses the same guide rail as the seat within a vehicle.

These and other objects of the invention will become apparent through the following description and claims.

BRIEF DESCRIPTION OF THE DRAWINGS

FIG. 4 is a perspective view of a second embodiment of a tie-down hoop according to the present invention, showing the parts in their fixed positions.

FIG. 5 is a side view of a second embodiment of a tie-down hoop according to the present invention, showing the parts in their fixed positions.

FIG. 6 is an end view of a second embodiment of a tie-down hoop according to the present invention, showing the parts in their fixed positions.

FIG. 7 is a perspective view of a second embodiment of a tie-down hoop according to the present invention, showing the parts in their sliding positions.

FIGS. 33–40 are views of a fourth embodiment of a tie-down hoop according to the present invention, showing a tie-down hoop in the locked configuration.

FIGS. 41–47 are views of the bezel of the fourth embodiment of a tie-down hoop according to the present invention.

FIGS. 48–54 are views of the bushing of the fourth embodiment of a tie-down hoop according to the present invention.

FIGS. 57–63 are views of the slide plate of the fourth embodiment of a tie-down hoop according to the present invention.

FIGS. 64–65 are views of the leaf spring of the fourth embodiment of a tie-down hoop according to the present invention.

FIGS. 66–68 are views of the channel or guide rail of the fourth embodiment of a tie-down hoop according to the present invention.

Like reference numbers denote like elements throughout the drawings.

DETAILED DESCRIPTION OF THE PREFERRED EMBODIMENTS

Figure 1:
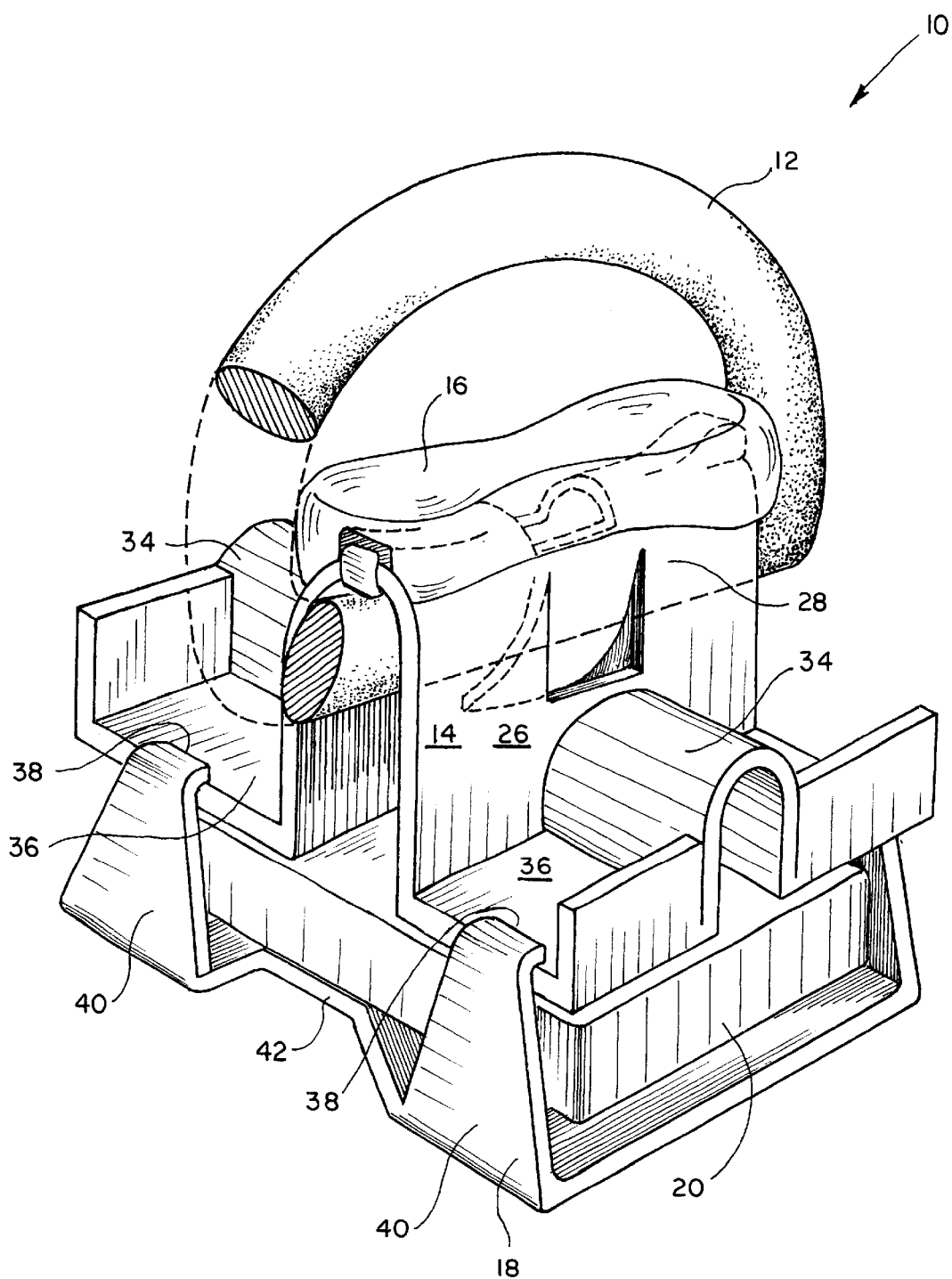
FIG. 1 is a perspective view of a first embodiment of a tie-down hoop according to the present invention.
Figure 2:
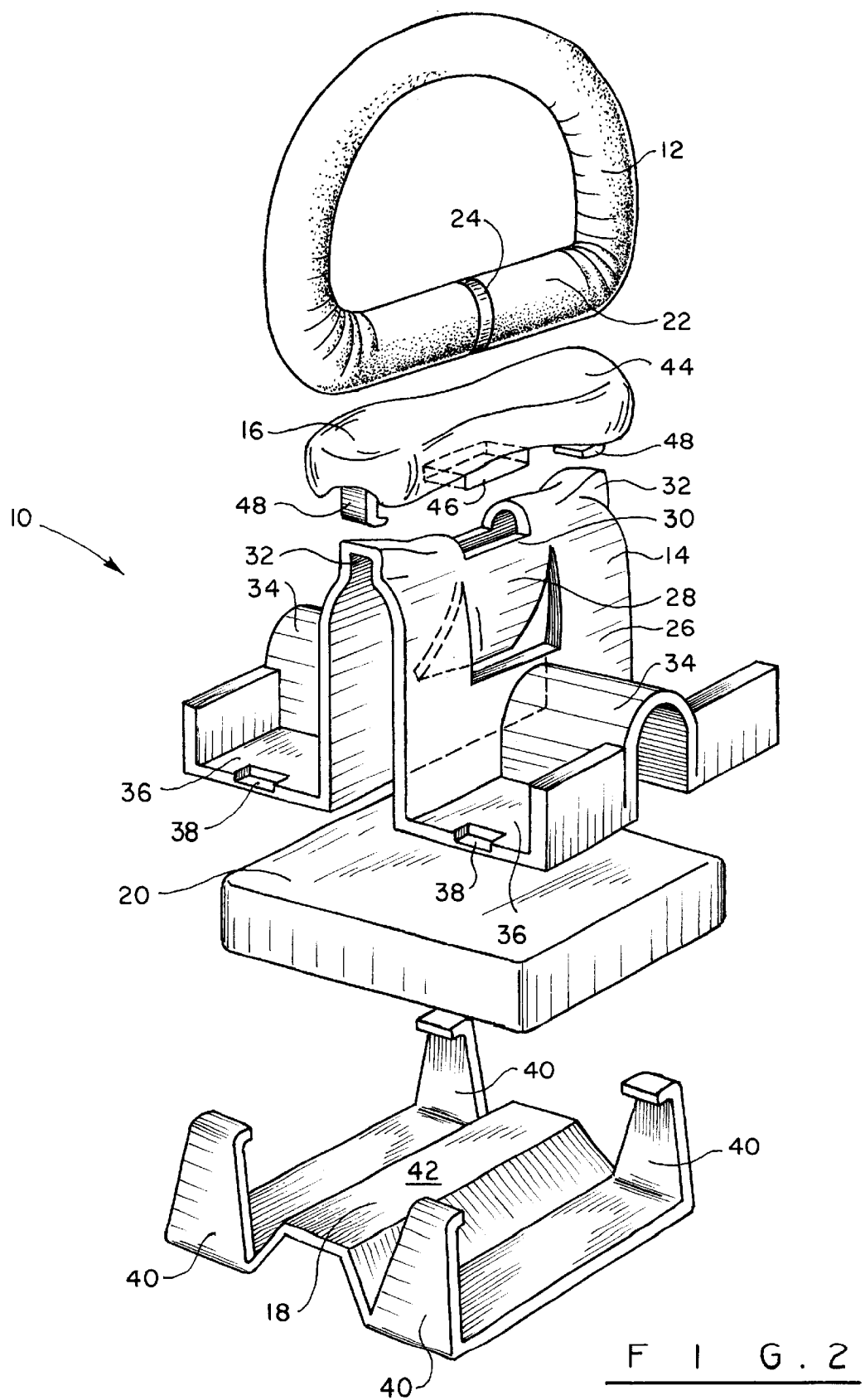
FIG. 2 is an exploded, perspective view of first embodiment of a tie-down hoop according to the present invention.

Referring to FIGS. 1–2, a first embodiment of the tie-down hoop 10 includes a hoop 12, a bezel 14, a button 16, a sliding plate 18, and means for biasing the bezel 14 away from the sliding plate 18, preferably an elastomeric spring 20.

The hoop 12 is preferably a D-shaped wire hoop, with the straight portion 22 on the bottom. A preferred means for forming the hoop 12 is to weld the wire at the center 24 of the straight portion 22.

The bezel 14 includes a central arch 26, and is dimensioned and configured to receive the hoop's straight portion 22. The central arch 26 preferably includes a tab 28 defined within one side, and is dimensioned and configured to fold over the hoop's straight portion 22. The central arch 26 also defines a button opening 30, and a hook-receiving portion 32 at each end. The bezel 14 includes at least one lug 34, with a preferred embodiment including a pair of lugs 34 located on opposite sides of central arch 26. The bottom portion 36 of the bezel 14 preferably defines a plurality of hook-receiving openings 38. A preferred material for the bezel 14 is stamped steel.

he button 16 includes a top surface 44, a location peg 46 dimensioned and configured to fit within the button hole 30 of the bezel 14, and a hook 48 at each end being dimensioned and configured to mate with the hook receiving portions 32 of the bezel 14.

The sliding plate 18 includes a plurality of hooks 40, corresponding to the openings 38 in the bezel 14, and dimensioned and configured to secure the elastomeric spring 20 between the bezel 14 and sliding plate 18. The sliding plate 18 also defines an arch 42 dimensioned and configured to prevent interference between the sliding plate 18 and the heads of any bolts (not shown, and well-known) used to secure the guide rails within which the tie-down hoop 10 slides to the floor of a vehicle.

The elastomeric spring 20 is preferably a foam block. It is dimensioned and configured to bias the bezel 14 away from the sliding plate 18.

Figure 3:
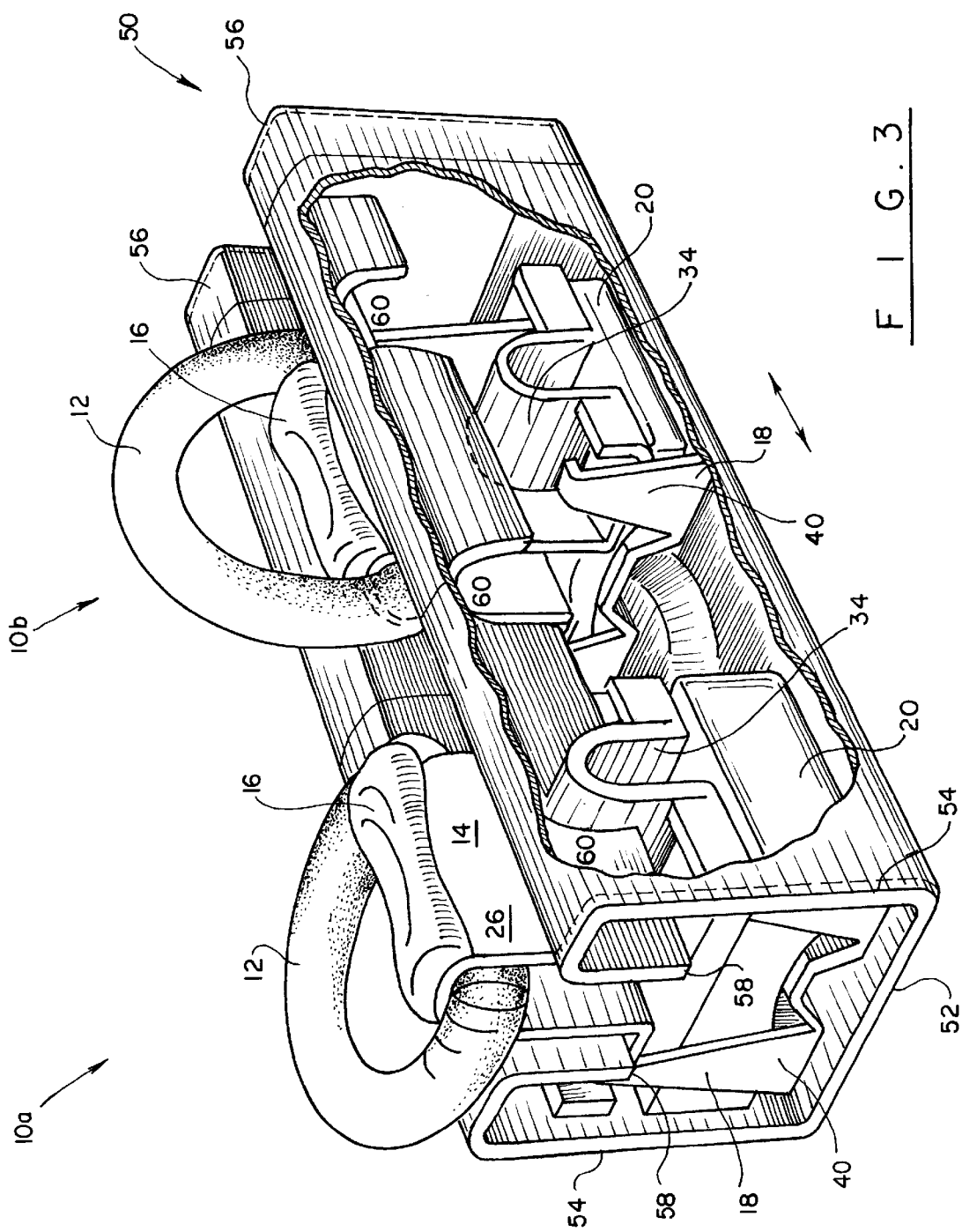
FIG. 3 is an environmental, partially cutaway perspective view of a first embodiment of a tie-down hoop according to the present invention, showing one hoop within the guide rail in a detent position, and a second hoop sliding between detents.
Figure 8:
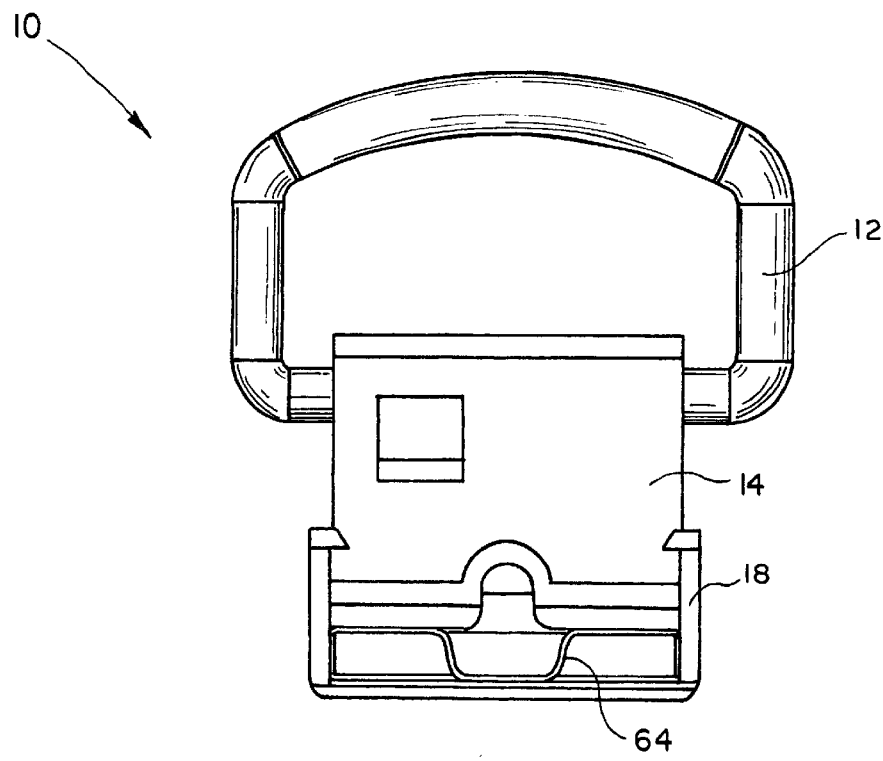
FIG. 8 is a side view of a second embodiment of a tie-down hoop according to the present invention, showing the parts in their sliding positions.
Figure 9:
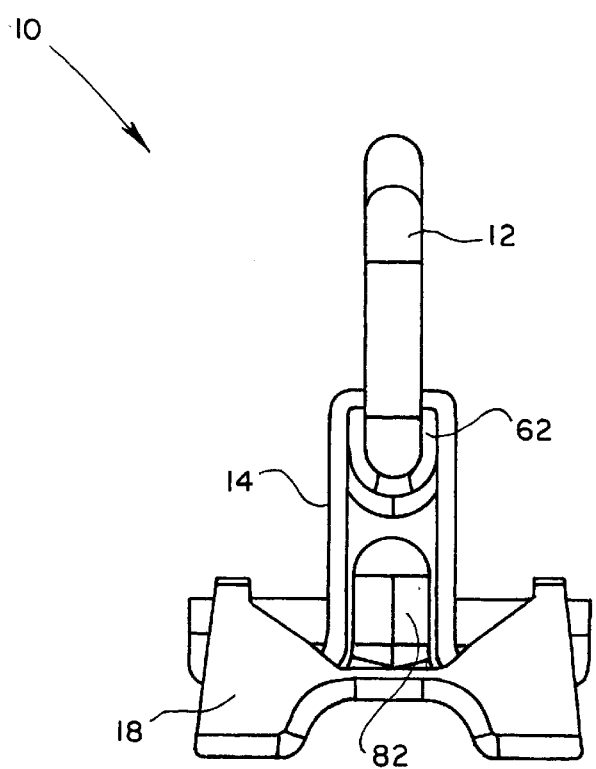
FIG. 9 is an end view of a second embodiment of a tie-down hoop according to the present invention, showing the parts in their sliding positions.
Figure 10:
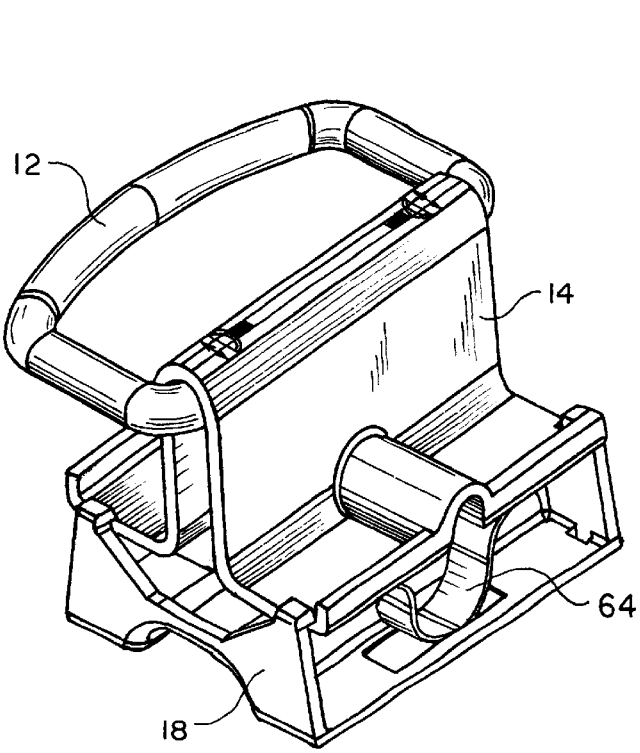
FIG. 10 is a perspective view of a third embodiment of a tie-down hoop according to the present invention, showing the parts in their locked positions.
Figure 11:
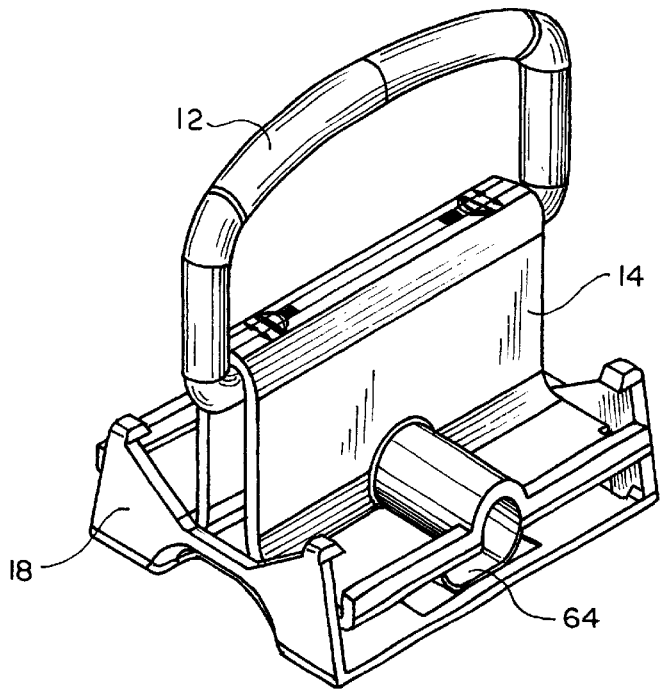
FIG. 11 is a perspective view of a third embodiment of a tie-down hoop according to the present invention, showing the parts in their sliding positions.
Figures 12, 13, 14:
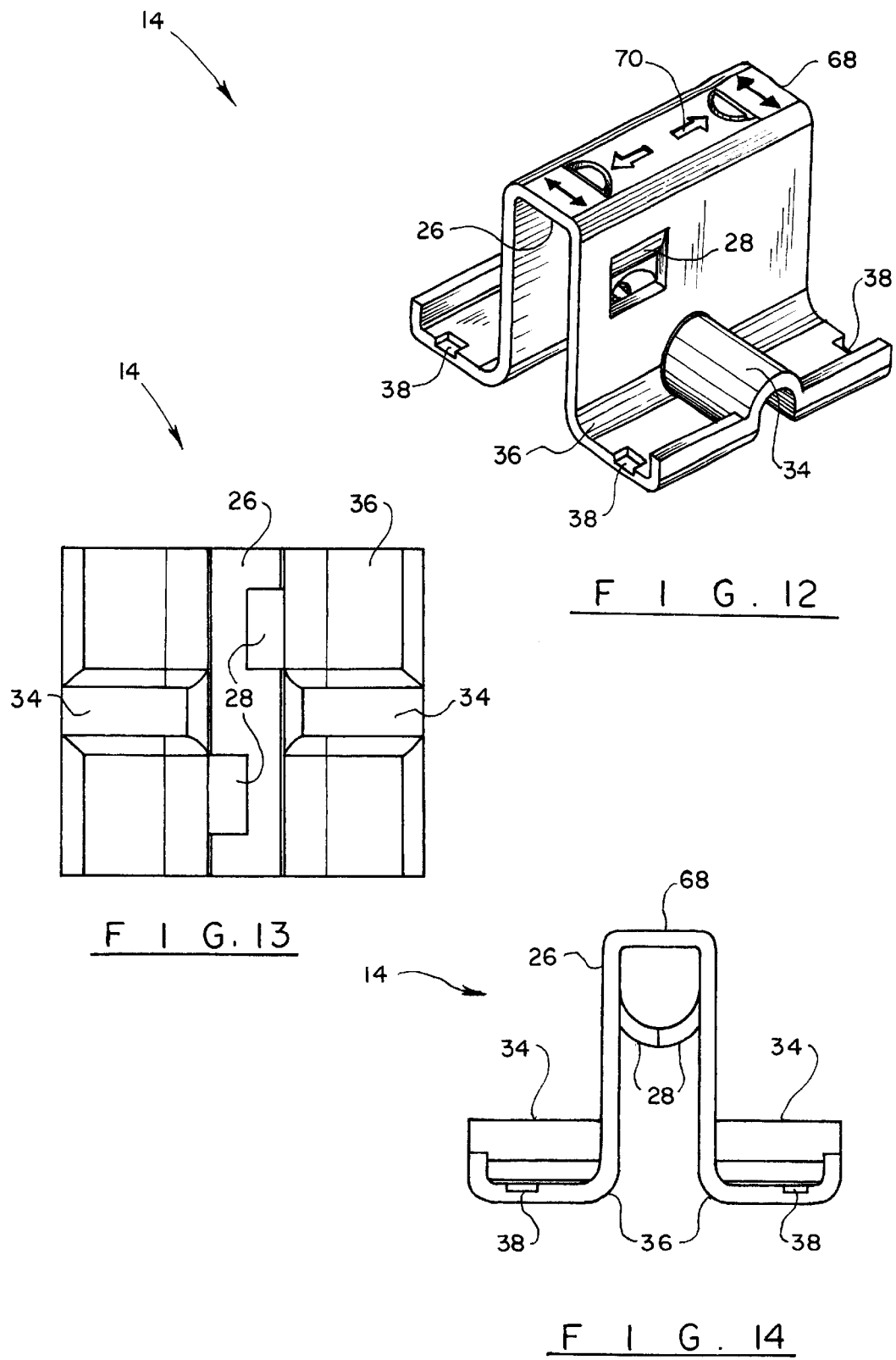
FIG. 12 is a perspective view of a bezel for a second embodiment of a tie-down hoop according to the present invention.
FIG. 13 is a bottom view of a bezel for a second embodiment of a tie-down hoop according to the present invention.
FIG. 14 is an end view of a bezel for a second embodiment of a tie-down hoop according to the present invention.

A preferred guide rail 50 for use with all embodiments of the tie-down hoop 10, 110 is illustrated in FIG. 3. The guide rail 50 includes a bottom 52, a pair of sides 54, and a top section 56 projecting horizontally from each side 54. The top sections 56 define a space between them dimensioned and configured to receive the hoop 12 and bezel's central arch 26. A flange 58 extends downwardly from an edge of each top section 56. Each flange 58 defines a plurality of detents 60, dimensioned and configured to engage the bezel's lugs 34 or detent bumps 134. In the preferred embodiment, the detents 60 on one flange 58 correspond to the detents 60 on the opposing flange 58.

The operation of the tie-down hoop 10 is also best illustrated in FIG. 3. A first tie-down hoop 10, hereinafter referred to as 10a, is illustrated secured in place at one of the detents 60. The elastomeric spring 20 biases the bezel 14 upwardly, so that the bezel's lugs 34 engage the detents 60, thereby securing the tie-down hoop 10a in place. Pushing down on the button 16 compresses the elastomeric spring 20, thereby allowing the bezel's lugs 34 to exit the detents 60, permitting the tie-down hoop 10a to slide within the rail 50, illustrated by the hoop 10b in FIG. 3. Pushing the hoop 12 in the desired direction will cause the bezel 14 to move in the desired direction, which in turn pushes on the hooks 40 of the sliding plate 18, thereby moving the sliding plate 18 as well. Releasing the button 16 permits the elastomeric spring 20 to bias the bezel 14 upwardly, so that when the next pair detents 60 are reached, the bezel's lugs 34 will engage the detents 60, thereby securing the tie-down hoop 10b in place. The hoop 12 may be rotated upwardly for use (see the hoop 12 within tie-down hoop 10b), or downwardly so that it remains out of the way when not in use (see the hoop 12 within tie-down hoop 10a).

Second and third embodiments of the invention are illustrated in FIGS. 4–24. The second and third embodiments differ primarily in the presence or absence of a bushing 62 between the hoop 12 and bezel 14, and will therefore be described together. Referring to FIGS. 4–11 and the exploded view of FIG. 22, the second and third embodiments of the tie-down hoop 10 include a hoop 12, a bezel 14, possibly a bushing 62 between the hoop 12 and bezel 14, a sliding plate 18, and means for biasing the bezel 14 away from the sliding plate 18, preferably a pair of leaf springs 64.

Figure 20:
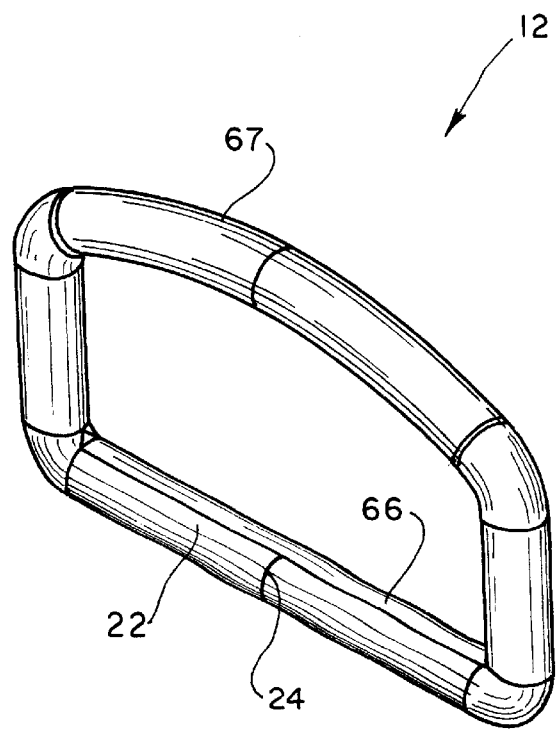
FIG. 20 is a perspective view of a hoop for a tie-down hoop according to the present invention.

As illustrated in FIG. 20, the hoop 12 is preferably a D-shaped wire hoop, with the straight portion 22 on the bottom, having a flat surface 66 facing towards the hoop's top 67. A preferred means for forming the hoop 12 is to weld the wire at the center 24 of the straight portion 22.

Figure 18:
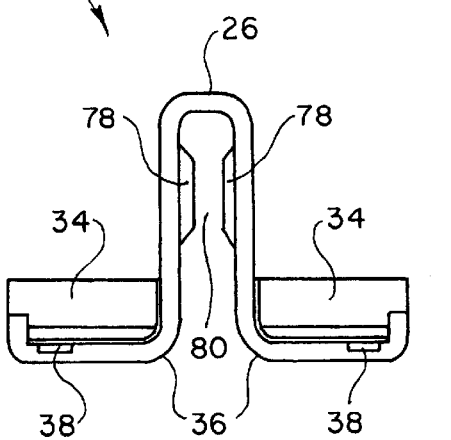
FIG. 18 is a side view of a bezel for a third embodiment of a tie-down hoop according to the present invention.

Referring to FIGS. 12–14 and 17–18, the bezel 14 includes a central arch 26, and is dimensioned and configured to receive the hoop's straight portion 22, possibly with the hoop's straight portion 22 surrounded by the bushing 62. The central arch 26 preferably includes a tab 28 defined within each side, and is dimensioned and configured to fold over the bushing 62 (if the bushing 62 is present) and the hoop's straight portion 22. The tabs 28 are preferably offset towards opposing ends of the central arch 26, thereby preventing the hoop 12 from rocking back and forth. The top surface 68 of the central arch 26 may be flat, and preferably includes indicia 70 showing the operation of the hoop. Alternately, as illustrated in Fig. 18, the central arch 26 may include a pair of bulges 78, which define a channel 80 therebetween having a width less than the width of the hoop 12, to retain the hoop 12. The bezel 14 includes at least one lug 34, with a preferred embodiment including a pair of lugs 34 located on opposite sides of the central arch 26. The bottom portion 36 of the bezel 14 preferably defines a plurality of hook-receiving openings 38. A preferred material for the bezel 14 is stamped steel or plastic.

Figure 15:
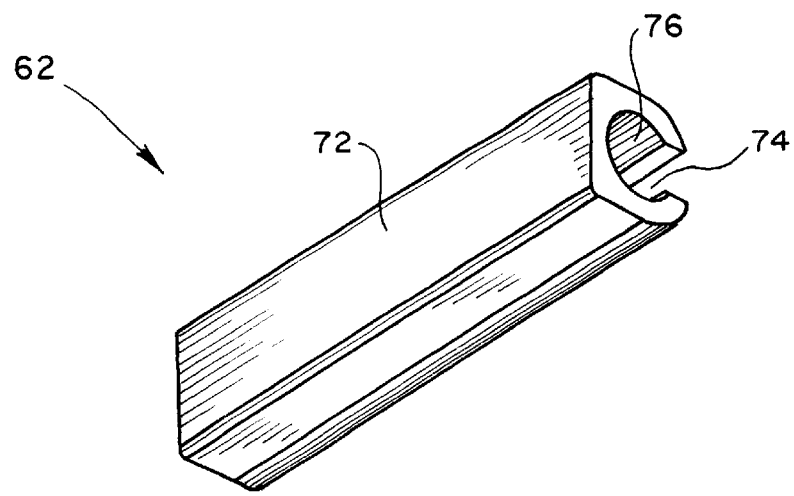
FIG. 15 is a perspective view of a bushing for a second embodiment of a tie-down hoop according to the present invention.

The bushing 62 is illustrated in FIG. 15. The bushing 62 is dimensioned and configured to fit nonrotatably within the central arch 26 of the bezel 14. The rotation of the bushing 62 may be prevented by a flat surface 72 corresponding to the flat top surface 68 of the bezel 14. The bushing 62 defines a longitudinal channel 74 that is dimensioned and configured to receive the hoop 12. A flat top portion 76 is preferably defined within the channel 74, corresponding to the flat surface 66 of the hoop 12. Referring to FIGS. 4–11 and 22, the bushing 62 will fit between the hoop 12 and bezel 14. The bushing 62 will permit rotation of the hoop 12, and the combination of flat surfaces 66, 76 provides a detent to secure the hoop 12 in a vertical position.

Figure 16:
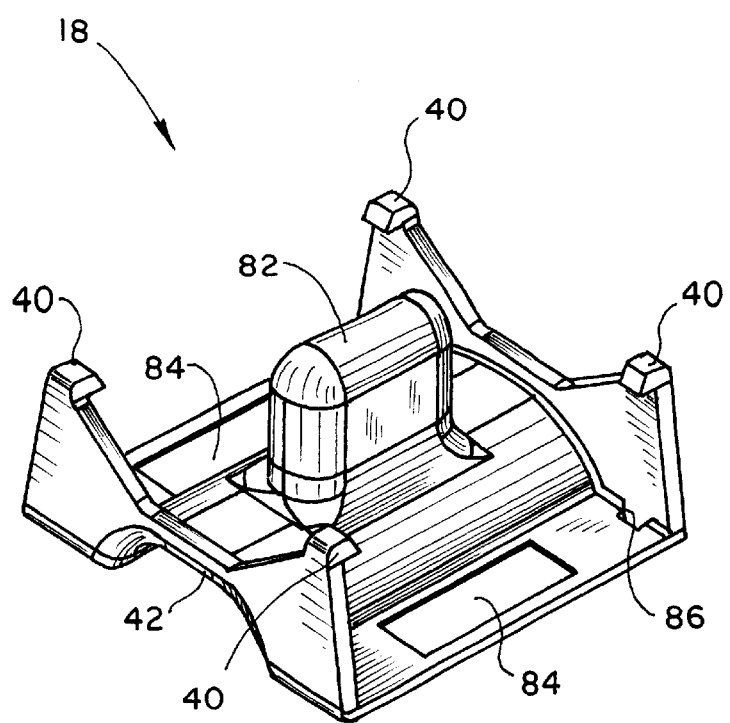
FIG. 16 is a perspective view of a sliding plate for a second embodiment of a tie-down hoop according to the present invention.
Figure 17:
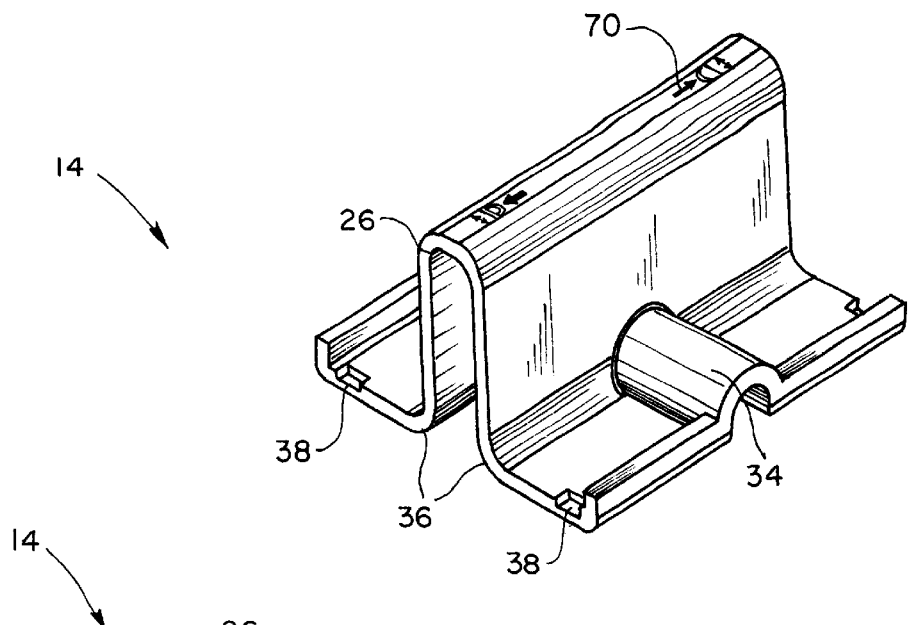
FIG. 17 is a perspective view of a bezel for a third embodiment of a tie-down hoop according to the present invention.
Figure 19:
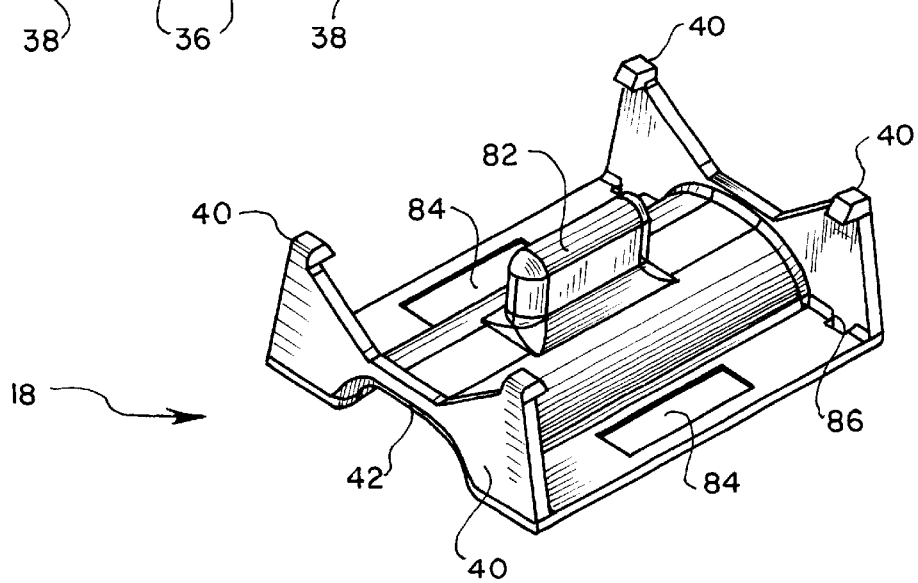
FIG. 19 is a perspective view of a sliding plate for a third embodiment of a tie-down hoop according to the present invention.

Referring to FIGS. 16 and 19, the sliding plate 18 includes a plurality of hooks 40 that correspond to the openings 38 in the bezel 14, and is dimensioned and configured to secure the leaf spring 64 between the bezel 14 and sliding plate 18. The sliding plate 18 also defines an arch 42 that is dimensioned and configured to prevent interference between the sliding plate 18 and the heads of any bolts used to secure the guide rails within which the tie-down hoop 10 slides to the floor of a vehicle (not shown). A guide 82 projects upwardly from the center of arch 42, and is dimensioned and configured to fit within the central arch 26 of the bezel 14, thereby preventing the bezel 14 and sliding plate 18 from rocking with respect to each other (best illustrated in FIGS. 6 and 9). Each side of the sliding plate 18 includes a depression 84 that is dimensioned and configured to retain a leaf spring 64. The sliding plate 18 may also include windows 86 adjacent to hooks 40 to facilitate molding of the sliding plate 18.

Figure 21:
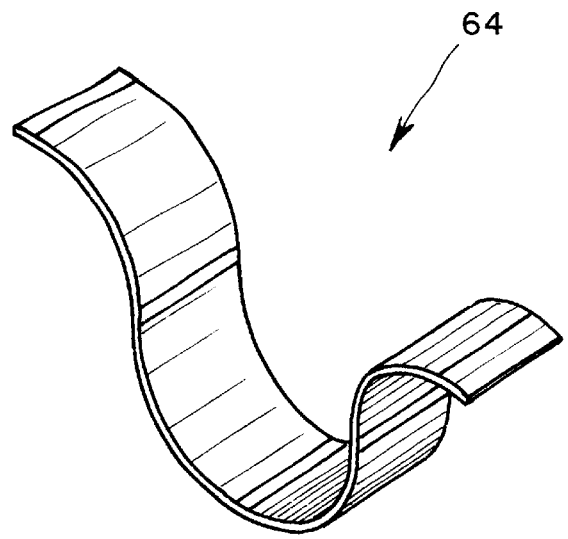
FIG. 21 is a perspective view of a leaf spring for a second and third embodiment of a tie-down hoop according to the present invention.
Figure 22:
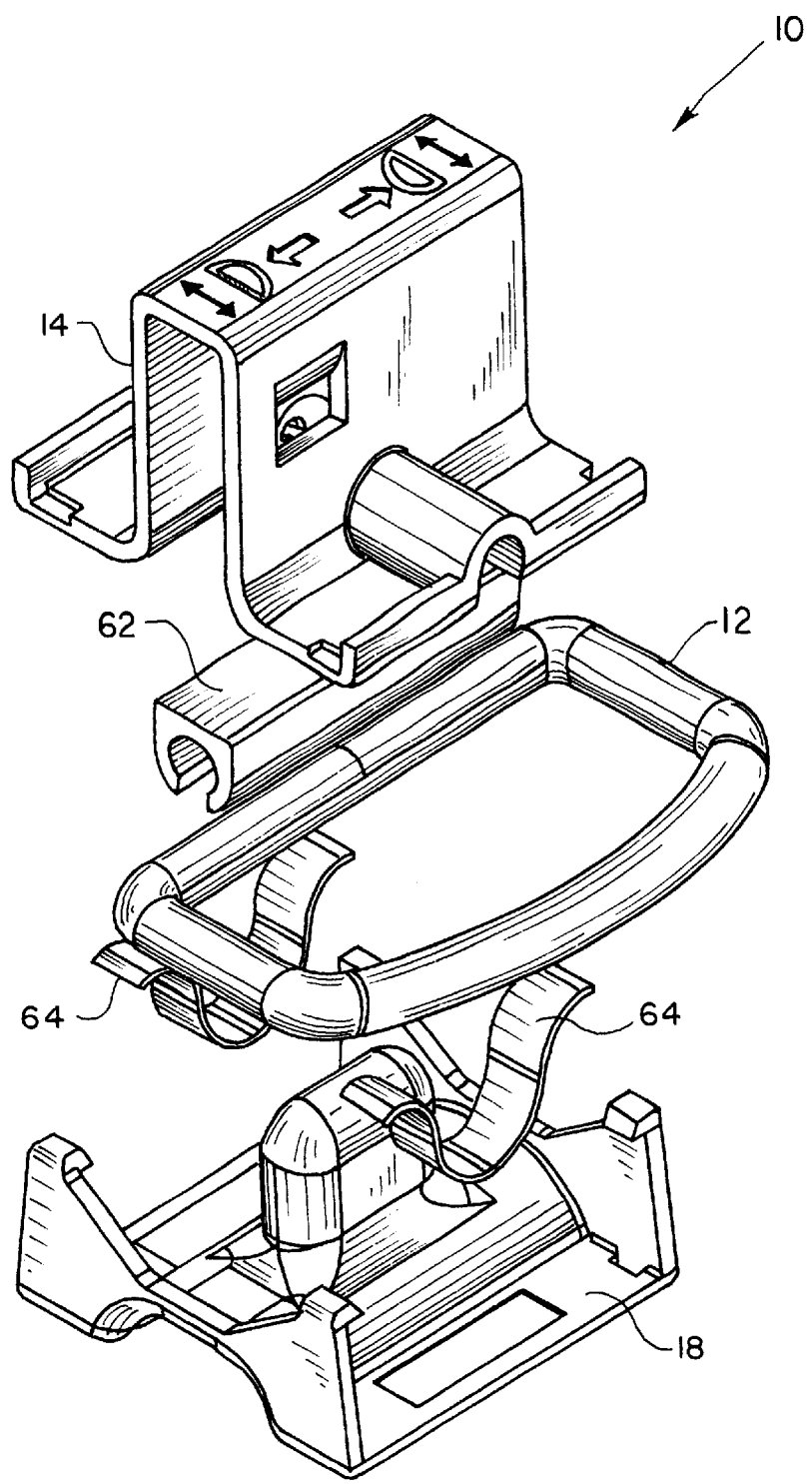
FIG. 22 is an exploded perspective view of a second embodiment of a tie-down hoop according to the present invention.
Figure 23:
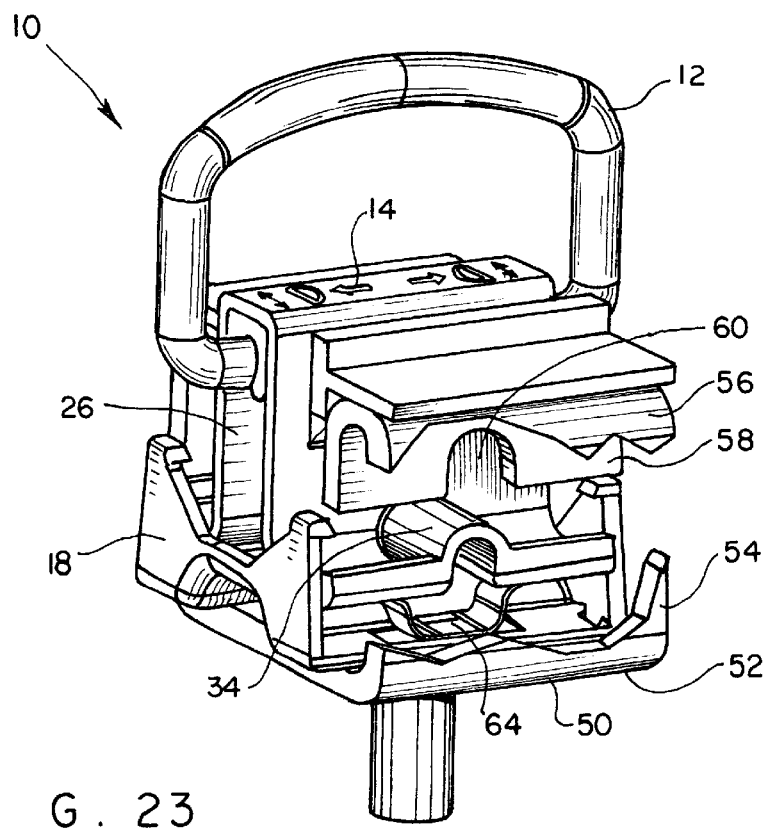
FIG. 23 is an environmental, partially cutaway perspective view of a second embodiment of a tie-down hoop according to the present invention, showing a hoop within the guide rail sliding between detents.

The means for biasing the bezel 14 away from the sliding plate 18 is preferably a pair of leaf springs 64, as illustrated in FIG. 21, positioned on opposing sides of the tie-down hoop 10. Each leaf spring 64 is dimensioned and configured to bias the bezel 14 away from the sliding plate 18.

Figure 24:
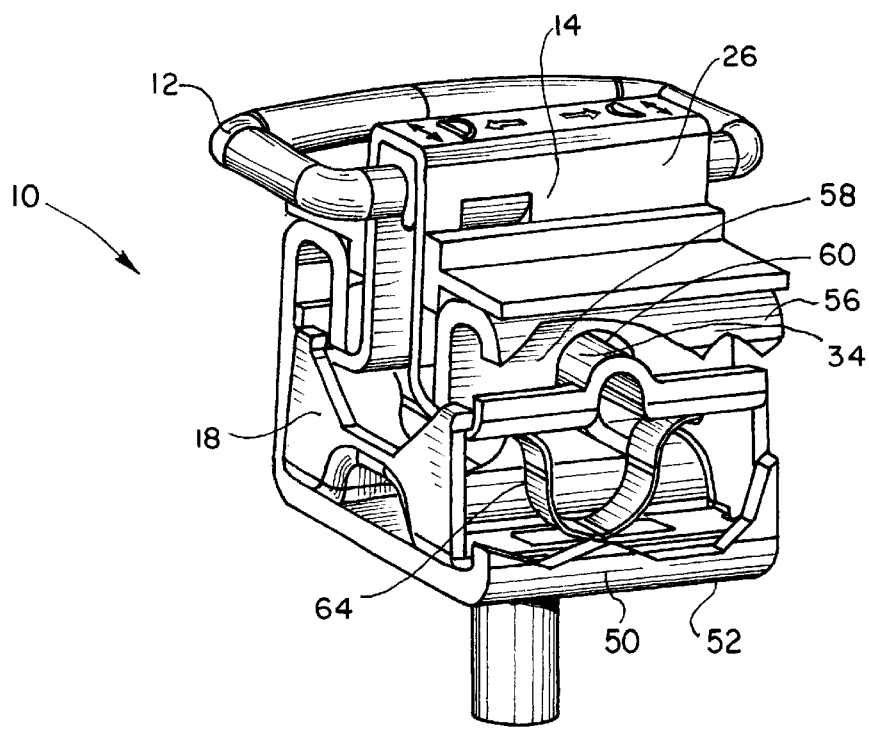
FIG. 24 is an environmental, partially cutaway perspective view of a second embodiment of a tie-down hoop according to the present invention, showing a hoop within the guide rail in a detent position.
Figure 25:
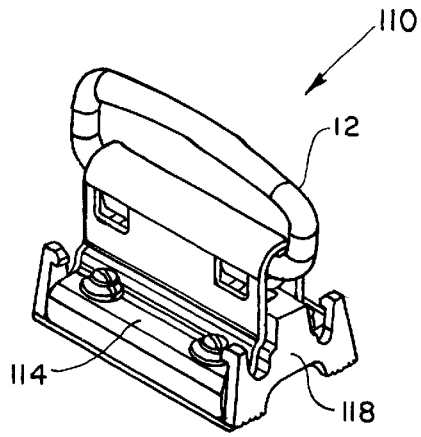
FIGS. 25–32 are views of a fourth embodiment of a tie-down hoop according to the present invention, showing a tie-down hoop in the released or depressed configuration.
Figure 29:
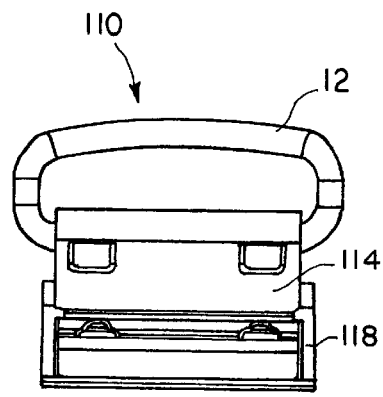
Figure 26:
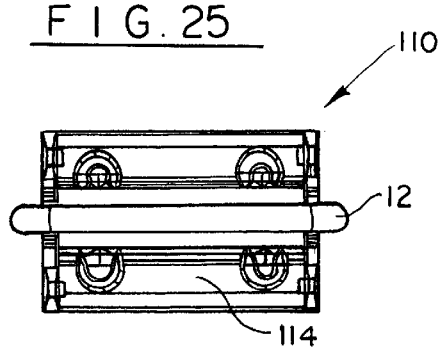
Figure 30:
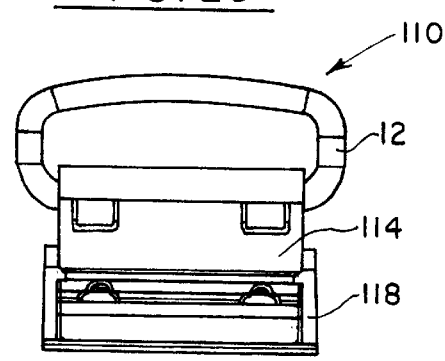

The operation of the tie-down hoop 10 is also best illustrated in FIGS. 4–11 and 23–24. A tie-down hoop 10 is illustrated in FIG. 24 secured in place at one of the detents 60. The leaf springs 64 biases the bezel 14 upward, so that the bezel's lugs 34 engage the detents 60, thereby securing the tie-down hoop 10 in place. Pushing down on the bezel 14 compresses the leaf springs 64, thereby allowing the bezel's lugs 34 to exit the detents 60, permitting the tie-down hoop 10 to slide within the rail 50, illustrated in FIG. 23. Pushing the hoop 12 in the desired direction will cause the bezel 14 to move in the desired direction, which in turn pushes on the hooks 40 of the sliding plate 18, thereby moving the sliding plate 18 as well. Releasing the bezel 14 permits the leaf springs 64 to bias the bezel 14 upward, so that when the next pair detents 60 are reached, the bezel's lugs 34 will engage the detents 60, thereby securing the tie-down hoop 10 in place. The hoop 12 may be rotated upward for use, or downward so that it remains out of the way when not in use.

A fourth embodiment of the invention is illustrated in FIGS. 25–68. The fourth embodiment of the tie-down hoop 110 included a hoop 12, a bezel 114, a bushing 162 between the hoop 12 and bezel 114, a sliding plate 118, and means for biasing the bezel 114 away from the sliding plate 118, preferably a leaf spring 164.

Figure 56:
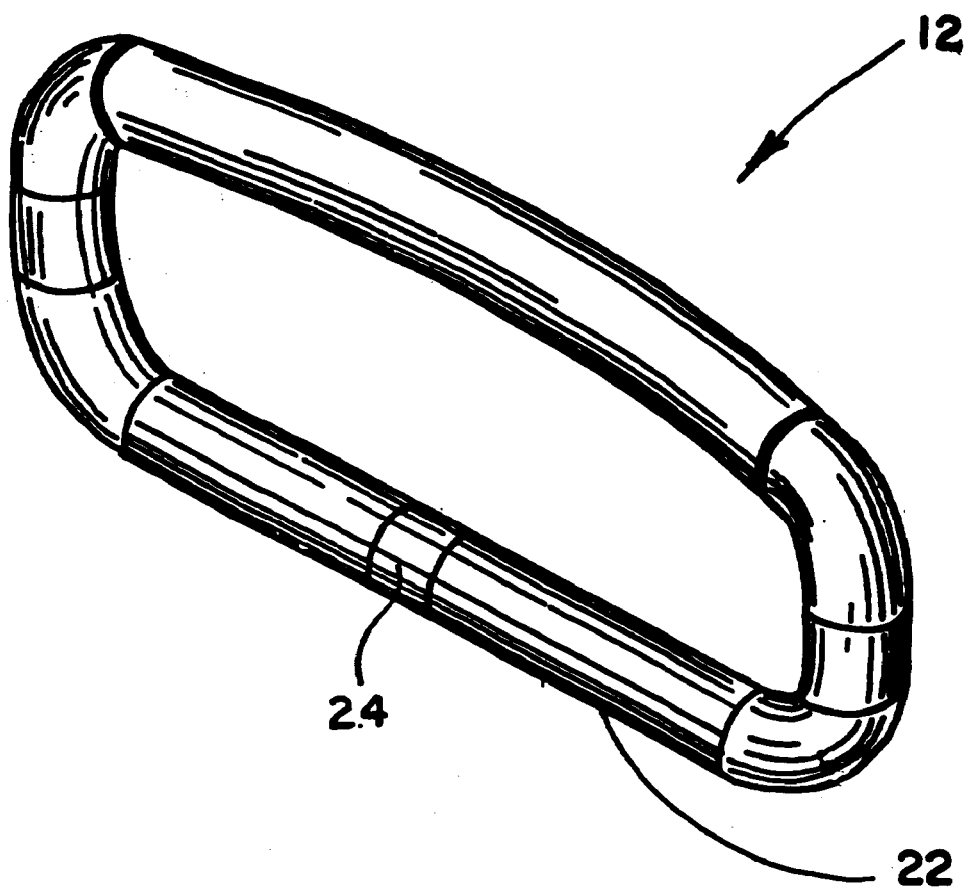
FIG. 56 is a perspective view of the hoop of the fourth embodiment of a tie-down hoop according to the present invention.

As illustrated in FIG. 56, the hoop 12 is preferably a D-shaped wire hoop, with the straight portion 22 on the bottom. A preferred means for forming the hoop 12 is to weld the wire at the center 24 of the straight portion 22.

Referring to FIGS. 25–68, the bezel 114 has a longer length than the bezel 14 of the first, second, or third embodiment. The bezel 114 includes a central arch 26, and is dimensioned and configured to receive the hoop's straight portion 22, possibly with the hoop's straight portion 22 surrounded by the bezel 114. The central arch 26 preferably includes a pair of tabs 28 defined within each side, and is dimensioned and configured to fold over the bushing 162 and the hoop's straight portion 22. The tabs 28 defined within each side are preferably offset towards opposing ends of the central arch 26, thereby acting as additional retaining means in preventing the hoop 12 from rocking back and forth. The top surface 68 of the central arch 26 is preferably of round shape to accommodate the bushing 162. The bezel 114 includes at least one detent bump 134, with a preferred embodiment including a pair of detent bumps 134 located on opposite sides of the central arch 26. Preferably, the detent bumps 134 have a generally triangular shape. The bottom portion 36 of the bezel 114 preferably defines a plurality of hook-receiving platforms 138. A preferred material for the bezel 114 is stamped steel or plastic.

Figure 27:
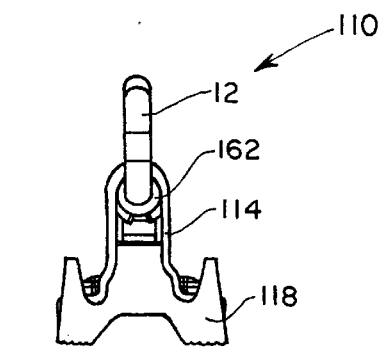
Figure 31:
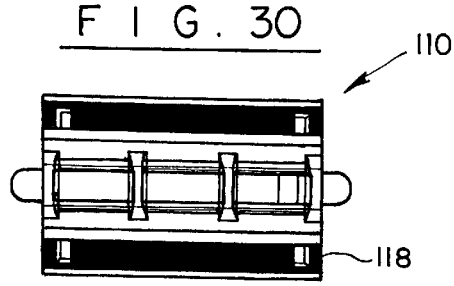
Figure 28:
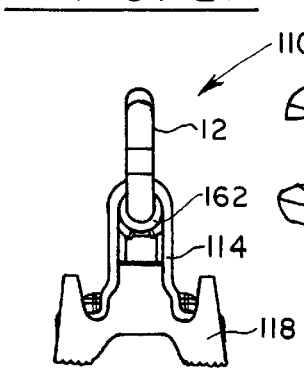
Figure 32:
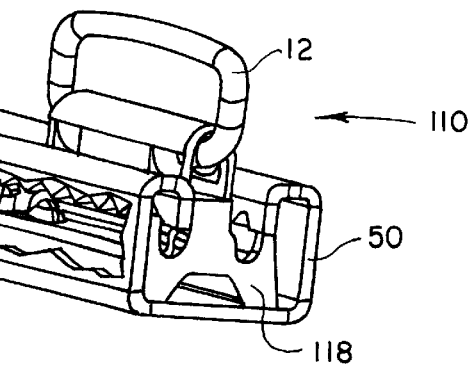
Figure 55:
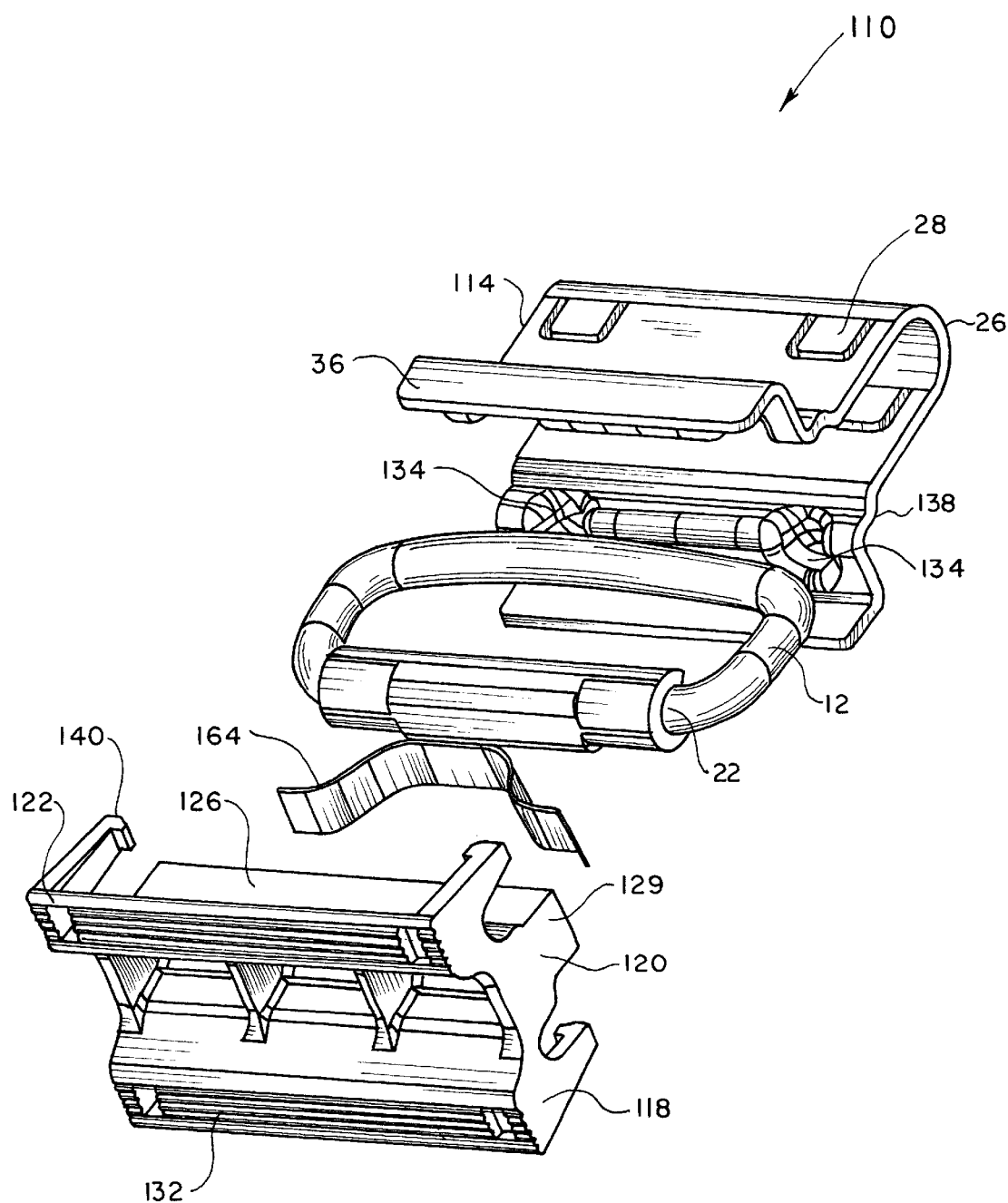
FIG. 55 is an exploded view of the fourth embodiment of a tie-down hoop according to the present invention.

The bushing 162 is illustrated in FIGS. 48–54. The bushing 162 has a substantially open top side 164a that is of generally round shape to correspond with the top surface 68 of the central arch 26 of the bezel 114. The bushing 162 is dimensioned and configured to fit generally nonrotatably within the central arch 26 of the bezel 114. The bushing 162 defines a longitudinal channel 174 that is dimensioned and configured to receive the hoop 12. Referring to FIGS. 27 and 28, the bushing 162 will fit between the hoop 12 and bezel 114. The bushing 162 will permit rotation of the hoop 12. The rotation of the bushing 162 may be prevented by a flat surface 172 on the bottom side 176 of the bushing 162. The flat surface 172 provides the spring 64 a smooth surface to slide against. It is preferred that the bushing 162 can be snapped onto the hoop 12 from the bottom of the straight portion 22 of the hoop 12.

Referring to FIGS. 25–40, 55 and 57–63, the sliding plate 118 includes a central platform 120, a base 122, and a plurality of hooks 140 that correspond to the platforms 138 in the bezel 114. The sliding plate 118 is dimensioned and configured to secure the leaf spring 164 between the bezel 114 and sliding plate 118. The sliding plate 118 also defines an arch 142 that is dimensioned and configured to prevent interference between the sliding plate 118 and the heads of any bolts used to secure the guide rails within which the tie-down hoop 110 slides to the floor of a vehicle (not shown). The central platform 120 has a top wall 124, a pair of side walls 126, 127, and a pair of end walls 128, 129. The central platform 120 projects upwardly from the center of the arch 142, and is dimensioned and configured to fit within the central arch 26 of the bezel 114, thereby preventing the bezel 114 and sliding plate 118 from rocking with respect to each other. The top wall 124 has a slot 130 to receive a portion of the leaf spring 164. The slot 130 is dimensioned and configured to help retain the leaf spring 164 in a stable position when the tie-down hoop 110 is assembled. The base 122 of the sliding plate 118 are provided with rails 132 to reduce frictional drag between the sliding plate 118 and the floor of the channel (not shown).

The means for biasing the bezel 114 away from the sliding plate 118 is preferably a leaf spring 164, as illustrated in FIGS. 64 and 65, having a retention tab 166 at one of the ends 170, 171. The leaf spring 164 is dimensioned and configured to bias the bezel 114 away from the sliding plate 118. The retention tab 166 is to be inserted through the slot 130 in the sliding plate 118. If the retention tab 166 proves to be insufficient to hold the leaf spring 164 in place during operation, the retention tab 166 may be bent over as a secondary operation. This additional operation may ensure that the leaf spring 164 remains in place, between the bezel 114 and sliding plate 118.

The operation of the tie-down hoop 110 is also best illustrated in FIGS. 25–40. A tie-down hoop 110 is illustrated in FIG. 40 secured in place at one of the detents 60. The leaf spring 64 biases the bezel 114 upward, so that the detent bumps 134 engage the detents 60, thereby securing the tie-down hoop 110 in place. Pushing down on the bezel 114 compresses the leaf spring 64, thereby allowing the detent bumps 134 to exit the detents 60, permitting the tie-down hoop 110 to slide within the rail 50, illustrated in FIG. 32. Pushing the hoop 12 in the desired direction will cause the bezel 114 to move in the desired direction, which in turn pushes on the hooks 140 of the sliding plate 118, thereby moving the sliding plate 118 as well. Releasing the bezel 114 permits the leaf spring 64 to bias the bezel 114 upward, so that when the next pair detents 60 are reached, the detent bumps 134 will engage the detents 60, thereby securing the tie-down hoop 110 in place. The hoop 12 may be rotated upward for use, or downward so that it remains out of the way when not in use.

It is to be understood that the invention is not limited to the preferred embodiments described herein, but encompasses all embodiments within the scope of the following claims.

What is claimed is:

1. A tie-down hoop having a locked configuration and a sliding configuration, said tie-down hoop comprising:
    a hoop;
    an elongated guide rail; and
    a sliding mechanism being engageable with said hoop and said elongated guide rail, said sliding mechanism being capable of assuming a locked configuration and a sliding configuration, said sliding mechanism being movable relative to said elongated guide rail when said sliding mechanism is in said sliding configuration, and being retained in a fixed position relative to said elongated guide rail when said sliding mechanism is in said locked configuration and engaged to said elongated guide rail;
    wherein said guide rail includes a bottom, a pair of sides, and a top section projecting horizontally from each side of said pair of sides wherein a space is defined therebetween, said space is dimensioned and configured to receive said hoop and a portion of said sliding mechanism, a flange extends downwardly from an edge of each top section, said flange defines a plurality of detents dimensioned and configured to engage at least one detent structure of said sliding mechanism.

2. The tie-down hoop according to claim 1, wherein said hoop is a D-shaped hoop.

3. The tie-down hoop according to claim 2, wherein said D-shaped hoop has a generally curved longitudinal portion, and a generally straight longitudinal portion being receivable by said sliding mechanism.

4. The tie-down hoop according to claim 3, wherein said generally straight longitudinal portion has a generally flat surface facing toward said generally curved longitudinal portion.

5. A tie-down hoop having a locked configuration and a sliding configuration, said tie-down hoop comprising:
    a hoop;
    a receiver; and
    a sliding mechanism being engageable with said hoop and said receiver, said sliding mechanism being capable of assuming a locked configuration and a sliding configuration, said sliding mechanism being movable relative to said receiver when said sliding mechanism is in said sliding configuration, and being retained in a fixed position relative to said receiver when said sliding mechanism is in said locked configuration and engaged to said receiver;
    wherein said sliding mechanism includes:
        a bezel being dimensioned and configured to receive at least a portion of said hoop;
        a sliding plate being engageable with said bezel; and
        means for biasing said bezel away from said sliding plate, said means for biasing being positioned between said bezel and said sliding plate when said tie-down hoop is assembled; and
    wherein a bottom portion of said bezel includes at least one hook-receiving aperture, said sliding plate includes at least one hook adapted for engaging with said at least one hook-receiving aperture of said bottom portion of said bezel.

6. The tie-down hoop according to claim 5, wherein said bezel includes at least one detent structure being engageable with said receiver for retaining said sliding mechanism in said fixed position relative to said receiver when said sliding mechanism is in said locked configuration and engaged to said receiver.

7. The tie-down hoop according to claim 5, wherein said sliding plate is dimensioned and configured to retain said means for biasing between said bezel and said sliding plate, said sliding plate defines an arch at a bottom surface of said sliding plate wherein said arch is dimensioned and configured to prevent interference between said sliding plate and means for securing said receiver to a panel.

8. The tie-down hoop according to claim 5, wherein said sliding plate includes a base with rails.

9. The tie-down hoop according to claim 5, wherein said means for biasing is a pair of leaf springs, each side of said sliding plate includes a depression that is dimensioned and configured to retain a corresponding leaf spring.

10. The tie-down hoop according to claim 5, wherein means for biasing is an elastomeric spring.

11. The tie-down hoop according to claim 10, wherein said elastomeric spring is a foam block.

12. The tie-down hoop according to claim 10, wherein said elastomeric spring is at least one leaf spring.

13. The tie-down hoop according to claim 5, wherein said bezel includes an arch being dimensioned and configured to receive said at least a portion of said hoop.

14. The tie-down hoop according to claim 13, wherein said arch is positioned about a central position of said bezel.

15. The tie-down hoop according to claim 13, wherein said arch includes at least one tab defined within one side.

16. The tie-down hoop according to claim 13, wherein said sliding mechanism further includes a button being engageable with said arch of said bezel, said button being capable of causing said means for biasing to be compressed when said button is pushed toward said means for biasing and to be uncompressed when said button is released.

17. The tie-down hoop according to claim 16, wherein said button includes a top surface, a location peg, and a hook positioned about at least one end of said button, said arch defines a button aperture and a hook-receiving portion, said button aperture is dimensioned and configured to receive said location peg, said hook-receiving portion is dimensioned and configured to engage with said hook of said button.

18. The tie-down hoop according to claim 13, wherein said sliding mechanism further includes a bushing being dimensioned and configured to fit nonrotatably within said arch of said bezel, said bushing defines a longitudinal channel being dimensioned and configured to receive said at least a portion of said hoop.

19. The tie-down hoop according to claim 18, wherein a top surface of said bushing has a generally similar shape as a top surface of said arch of said bezel.

20. The tie-down hoop according to claim 19, wherein said bushing permits rotation of said hoop and said shape is capable of providing a detent to secure said hoop in a predetermined position.

21. The tie-down hoop according to claim 13, wherein said arch includes a pair of bulges that define a channel therebetween having a width less than a width of said hoop.

22. The tie-down hoop according to claim 13, wherein said sliding plate defines an arch at a bottom surface of said sliding plate wherein said arch at said bottom surface is dimensioned and configured to prevent interference between said sliding plate and means for securing said receiver to a panel, said sliding plate further defines a guide projecting upwardly from a central portion of said arch at said bottom surface, said guide is dimensioned and configured to fit within said arch of said bezel.

23. The tie-down hoop according to claim 22, wherein said means for biasing is a leaf spring having a retention tab at an end of said leaf spring, said guide has at least a top wall and a pair of side walls, said top wall of said guide has a slot to receive and retain said retention tab.

24. A tie-down hoop having a locked configuration and a sliding configuration, said tie-down hoop being mountable within a receiver, said tie-down hoop comprising:
assembled; and
a D-shaped hoop; and
a sliding mechanism being engageable with said hoop and the receiver, said sliding mechanism being capable of assuming a locked configuration and a sliding configuration, said sliding mechanism being movable relative to the receiver when said sliding mechanism is in said sliding configuration and being retained in a fixed position relative to the receiver when said sliding mechanism is in said locked configuration and engaged to the receiver;
wherein said hoop has a generally curved longitudinal portion, and a generally straight longitudinal portion being receivable by said sliding mechanism, said generally straight longitudinal portion having a generally flat surface facing toward said generally curved longitudinal portion.

25. A tie-down hoop having a locked configuration and a sliding configuration, said tie-down hoop being mountable within a receiver, said tie-down hoop comprising:
a hoop; and
a sliding mechanism being engageable with said hoop and the receiver, said sliding mechanism being capable of assuming a locked configuration and a sliding configuration, said sliding mechanism being movable relative to the receiver when said sliding mechanism is in said sliding configuration and being retained in a fixed position relative to the receiver when said sliding mechanism is in said locked configuration and engaged to the receiver;
wherein said sliding mechanism includes:
a bezel being dimensioned and configured to receive at least a portion of said hoop;
a sliding plate being engageable with said bezel; and
means for biasing said bezel away from said sliding plate, said means for biasing being positioned between said bezel and said sliding plate when said tie-down hoop is assembled; and
wherein a bottom portion of said bezel includes at least one hook-receiving aperture, said sliding plate includes at least one hook adapted for engaging with said at least one hook-receiving aperture of said bottom portion of said bezel.

26. The tie-down hoop according to claim 25, wherein said bezel includes at least one detent structure being engageable with the receiver for retaining said sliding mechanism in said fixed position relative to the receiver when said sliding mechanism is in said locked configuration and engaged to the receiver.

27. The tie-down hoop according to claim 25, wherein said sliding plate is dimensioned and configured to retain said means for biasing between said bezel and said sliding plate, said sliding plate defines an arch at a bottom surface of said sliding plate wherein said arch is dimensioned and configured to prevent interference between said sliding plate and means for securing said receiver to a panel.

28. The tie-down hoop according to claim 25, wherein said sliding plate includes a base with rails.

29. The tie-down hoop according to claim 25, wherein said means for biasing is a pair of leaf springs, each side of said sliding plate includes a depression that is dimensioned and configured to retain a corresponding leaf spring.

30. The tie-down hoop according to claim 25, wherein means for biasing is an elastomeric spring.

31. The tie-down hoop according to claim 30, wherein said elastomeric spring is a foam block.

32. The tie-down hoop according to claim 30, wherein said elastomeric spring is at least one leaf spring.

33. The tie-down hoop according to claim 25, wherein said bezel includes an arch being dimensioned and configured to receive said at least a portion of said hoop.

34. The tie-down hoop according to claim 33, wherein said arch is positioned about a central position of said bezel.

35. The tie-down hoop according to claim 33, wherein said arch includes at least one tab defined within one side.

36. The tie-down hoop according to claim 33, wherein said sliding mechanism further includes a button being engageable with said arch of said bezel, said button being capable of causing said means for biasing to be compressed when said button is pushed toward said means for biasing and to be uncompressed when said button is released.

37. The tie-down hoop according to claim 36, wherein said button includes a top surface, a location peg, and a hook positioned about at least one end of said button, said arch defines a button aperture and a hook-receiving portion, said button aperture is dimensioned and configured to receive said location peg, said hook-receiving portion is dimensioned and configured to engage with said hook of said button.

38. The tie-down hoop according to claim 33, wherein said sliding mechanism further includes a bushing being dimensioned and configured to fit nonrotatably within said arch of said bezel, said bushing defines a longitudinal channel being dimensioned and configured to receive said at least a portion of said hoop.

39. The tie-down hoop according to claim 38, wherein a top surface of said bushing has a generally similar shape as a top surface of said arch of said bezel.

40. The tie-down hoop according to claim 39, wherein said bushing permits rotation of said hoop and said shape is capable of providing a detent to secure said hoop in a predetermined position.

41. The tie-down hoop according to claim 33, wherein said arch includes a pair of bulges that define a channel therebetween having a width less than a width of said hoop.

42. The tie-down hoop according to claim 33, wherein said sliding plate defines an arch at a bottom surface of said sliding plate wherein said arch at said bottom surface is dimensioned and configured to prevent interference between said sliding plate and means for securing the receiver to a panel, said sliding plate further defines a guide projecting upwardly from a central portion of said arch at said bottom surface, said guide is dimensioned and configured to fit within said arch of said bezel.

43. The tie-down hoop according to claim 42, wherein said means for biasing is a leaf spring having a retention tab at an end of said leaf spring, said guide has at least a top wall and a pair of side walls, said top wall of said guide has a slot to receive and retain said retention tab.

* * * * *